United States Patent
Birnbaum et al.

(10) Patent No.: US 11,698,680 B2
(45) Date of Patent: Jul. 11, 2023

(54) METHODS AND SYSTEMS FOR DECODING AND RENDERING A HAPTIC EFFECT ASSOCIATED WITH A 3D ENVIRONMENT

(71) Applicant: Immersion Corporation, San Francisco, CA (US)

(72) Inventors: David Birnbaum, Van Nuys, CA (US); Yeshwant Muthusamy, Allen, TX (US); Jamal Saboune, Montreal (CA); Christopher Ullrich, Ventura, CA (US)

(73) Assignee: IMMERSION CORPORATION, Aventura, FL (US)

( * ) Notice: Subject to any disclaimer, the term of this patent is extended or adjusted under 35 U.S.C. 154(b) by 0 days.

(21) Appl. No.: 17/343,811

(22) Filed: Jun. 10, 2021

(65) Prior Publication Data

US 2021/0397260 A1 Dec. 23, 2021

Related U.S. Application Data

(60) Provisional application No. 63/042,800, filed on Jun. 23, 2020.

(51) Int. Cl.
*G06F 3/01* (2006.01)
*G06T 15/04* (2011.01)
(Continued)

(52) U.S. Cl.
CPC .......... *G06F 3/016* (2013.01); *G06F 3/04842* (2013.01); *G06T 15/04* (2013.01);
(Continued)

(58) Field of Classification Search
CPC . G06F 3/01; G06F 3/011; G06F 3/016; G06F 3/167; G06F 3/04815; G06F 3/0484; G06F 2203/013; G06F 2203/015
See application file for complete search history.

(56) References Cited

U.S. PATENT DOCUMENTS 9,030,411 B2 5/2015 Itkowitz et al.
10,254,838 B2 * 4/2019 Venkatesan ............ A63F 13/23
(Continued)

OTHER PUBLICATIONS

International Search Report (ISA/210) for International Patent Application No. PCT/US2021/036911 issued/mailed by the Korean Patent Office dated Oct. 22, 2021.
(Continued)

*Primary Examiner* — Michael J Eurice
(74) *Attorney, Agent, or Firm* — Medler Ferro Woodhouse & Mills PLLC

(57) ABSTRACT

In aspects, methods and apparatus are provided for generating a haptic effect for a three-dimensional (3D) environment that is experienced virtually by a user. The methods may be performed by a processor, and includes receiving media data that describes the 3D environment, wherein the media data includes haptic data which describes a haptic characteristic associated with at least one object, structure, or event in the 3D environment. The method further includes performing a haptic decoding operation and a haptic rendering operation. The decoding operation may include extracting the haptic data from the media data. The haptic rendering operation may include generating a drive signal and communicating the drive signal to a haptic output device to cause the haptic output device to generate a haptic effect at a user peripheral device. Numerous other aspects are provided.

20 Claims, 29 Drawing Sheets

(51) Int. Cl.
    *G06T 15/10*     (2011.01)
    *H04N 13/172*    (2018.01)
    *H04L 51/046*    (2022.01)
    *H04L 51/06*     (2022.01)
    *G06F 3/04842*   (2022.01)
(52) U.S. Cl.
    CPC ............ *G06T 15/10* (2013.01); *H04L 51/046* (2013.01); *H04L 51/06* (2013.01); *H04N 13/172* (2018.05); *G06T 2210/21* (2013.01)

(56) References Cited

U.S. PATENT DOCUMENTS

| | | | | |
|---|---|---|---|---|
| 2014/0204002 | A1* | 7/2014 | Bennet | G06T 19/006 345/7 |
| 2014/0267076 | A1* | 9/2014 | Birnbaum | B25J 13/025 340/407.1 |
| 2014/0270681 | A1* | 9/2014 | Sen | G11B 31/00 386/230 |
| 2015/0355713 | A1* | 12/2015 | Lacroix | G06F 3/016 340/407.1 |
| 2017/0173457 | A1 | 6/2017 | Rihn | |
| 2017/0237789 | A1* | 8/2017 | Harner | H04L 65/4015 709/205 |
| 2019/0057583 | A1* | 2/2019 | Levesque | H04N 21/4325 |
| 2019/0094981 | A1* | 3/2019 | Bradski | H04N 13/344 |
| 2019/0369836 | A1* | 12/2019 | Faulkner | G06F 3/04845 |
| 2020/0128236 | A1 | 4/2020 | Sen et al. | |
| 2020/0368616 | A1* | 11/2020 | Delamont | G06F 3/0346 |
| 2021/0096726 | A1* | 4/2021 | Faulkner | G06F 1/1686 |
| 2021/0382544 | A1* | 12/2021 | Butcher | G06V 40/20 |
| 2022/0270509 | A1* | 8/2022 | Josephson | G06F 3/0346 |

OTHER PUBLICATIONS

Written Opinion of the International Searching Authority (ISA/237) for International Patent Application No. PCT/US2021/036911 issued/mailed by the Korean Patent Office dated Oct. 22, 2021.

* cited by examiner

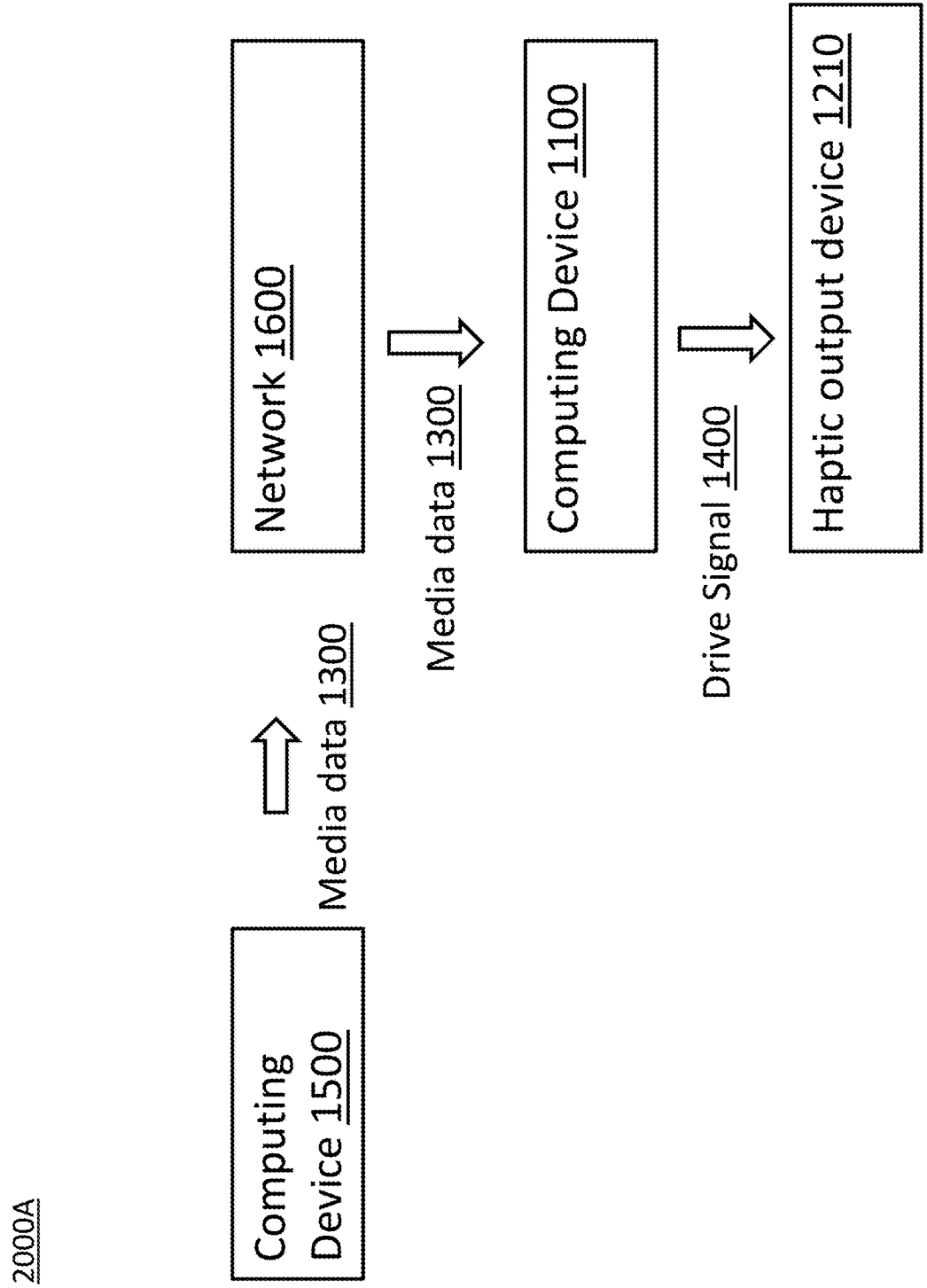

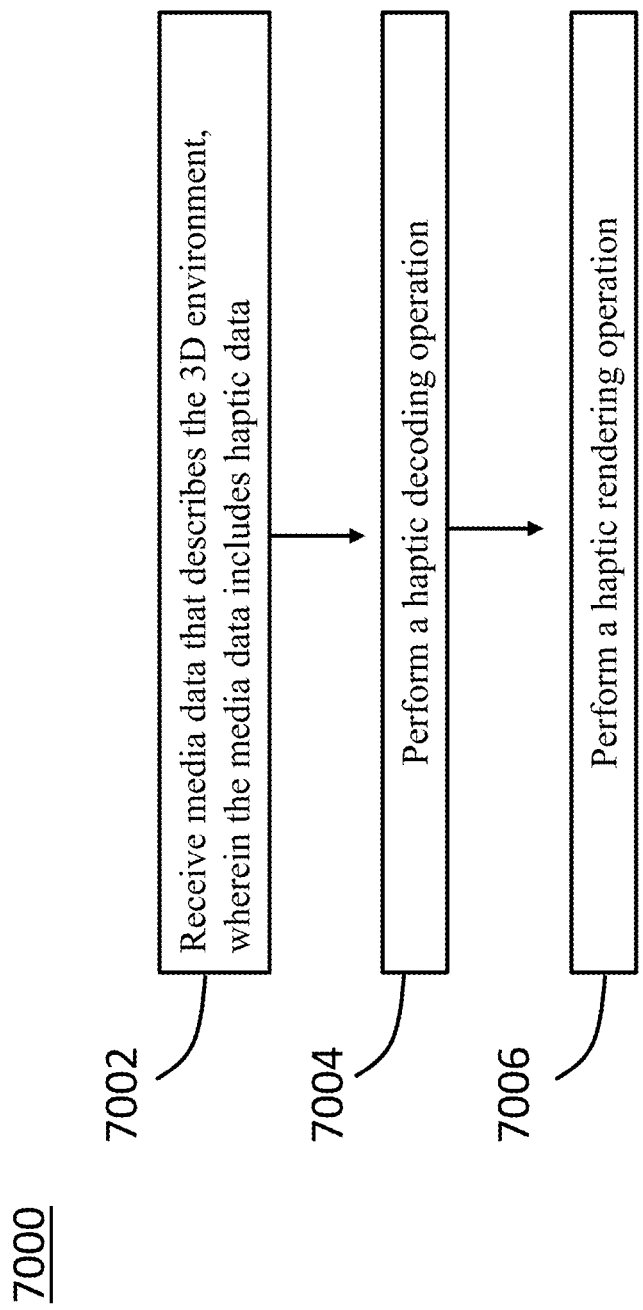

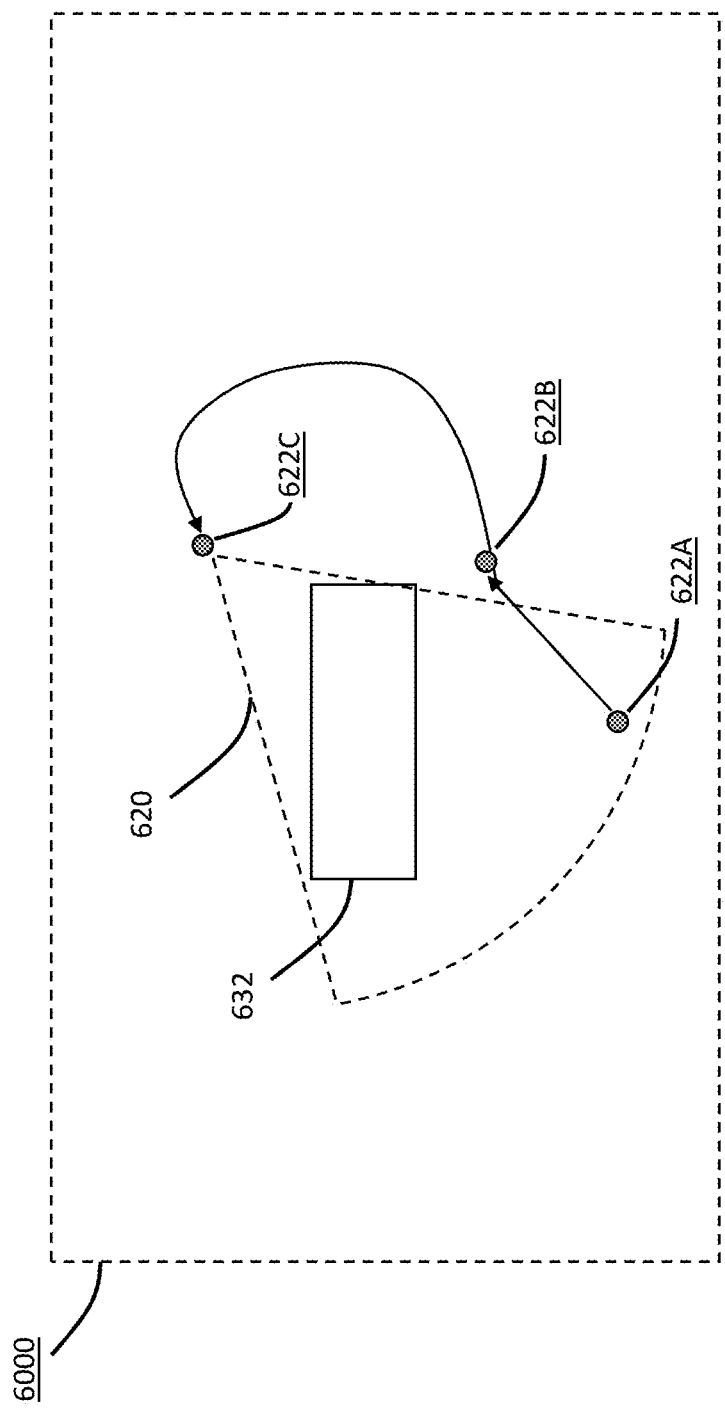

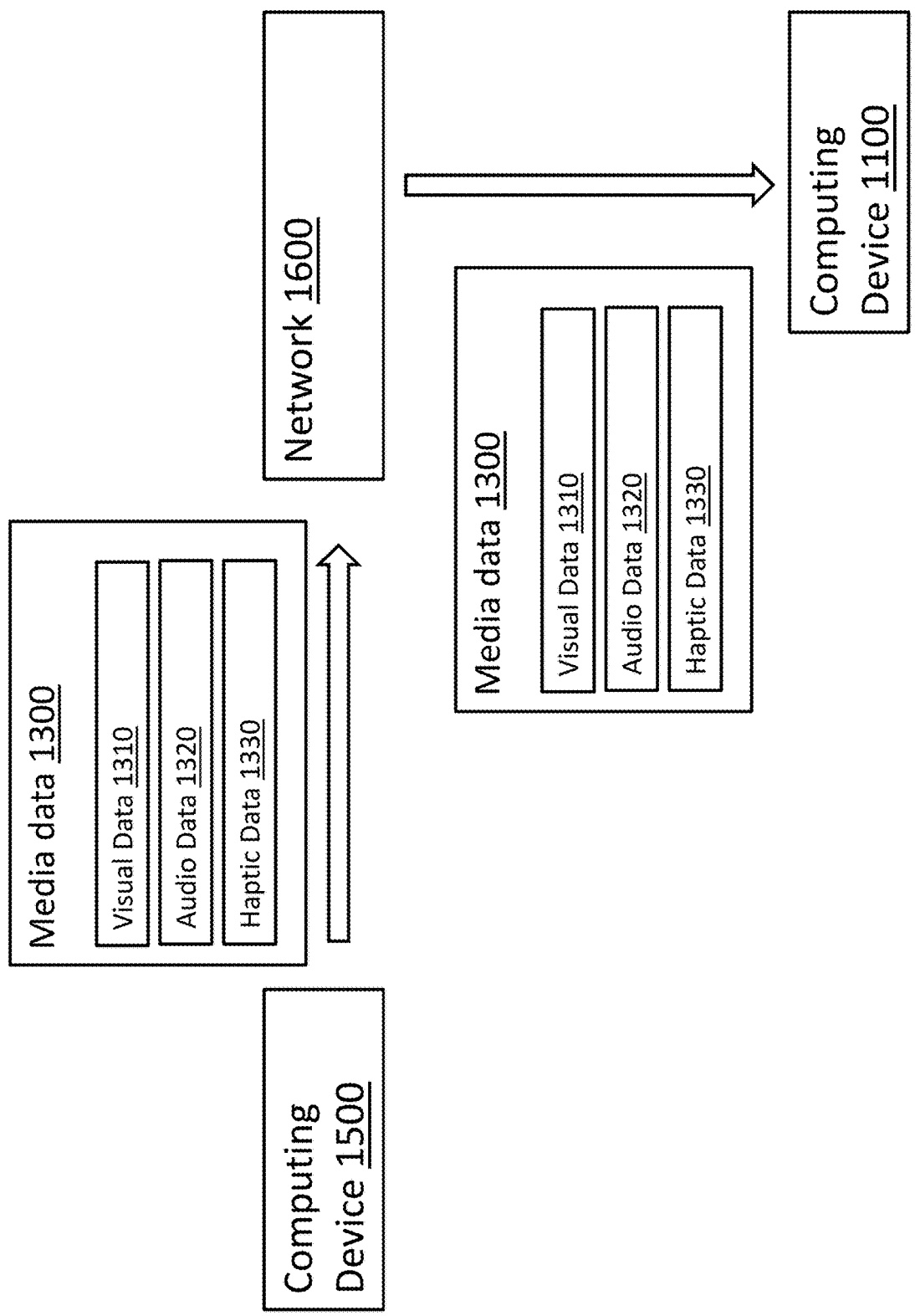

METHODS AND SYSTEMS FOR DECODING AND RENDERING A HAPTIC EFFECT ASSOCIATED WITH A 3D ENVIRONMENT

CROSS-REFERENCE TO RELATED APPLICATIONS

The present application claims priority to U.S. Provisional Application No. 63/042,800, entitled "HAPTICS FOR MPEG-I USE CASES" and filed on Jun. 23, 2020, the entire content of which is incorporated by reference herein.

FIELD OF THE INVENTION

The present invention is directed to a method and system for generating a haptic effect for a 3D environment, such as by performing a combination of a haptic decoding operation and a haptic rendering operation. The methods and systems may have application in entertainment, gaming, and other situations.

BACKGROUND

The Motion Pictures Expert Group (MPEG) is developing a standard referred to as MPEG-I, wherein "I" refers to presenting visual aspects and/or audio aspects of a scene in an immersive manner. Such a standard may be used to provide, for instance, a 360-degree video or 360-degree image which may provide to a user an omnidirectional view of a scene. In some instances, the 360-degree video or 360-degree image may provide a view which changes with a field of view, wherein the field of view may be controlled with multiple degrees of freedom, such as three degrees of freedom (3 DoF) or six degrees of freedom (6 DoF).

SUMMARY

Some aspect of the present disclosure relates to a method for providing haptic effects for a three-dimensional (3D) environment that is experienced virtually by a user. The method may be performed by at least one processor of a computing device or a user peripheral device, such as may be performed when the at least one processor executes instructions on a non-transitory computer-readable medium. The method may include receiving, by at least one processor, media data that describes the 3D environment, wherein the media data includes haptic data which describes a haptic characteristic associated with at least one object, structure, or event in the 3D environment; performing, by the at least one processor, a haptic decoding operation that includes extracting the haptic data from the media data; and performing, by the at least one processor, a haptic rendering operation. The haptic rendering operation may include: (i) generating a drive signal based on the haptic characteristic and based on at least one of a virtual viewpoint location of a user in the 3D environment or a virtual field of view of the user in the 3D environment, and (ii) communicating the drive signal to a haptic output device in a user peripheral device in communication with the at least one processor, to cause the haptic output device to generate a haptic effect at the user peripheral device. The virtual viewpoint location may be a location at which the user is virtually located in the 3D environment, or is a location at which a 3D representation of the user is located in the 3D environment.

Some aspect of the present disclosure relates to a method for providing haptic effects for a chat application. The method may be performed by at least one processor of an end user device, such as may be performed when the at least one processor executes instructions on a non-transitory computer-readable medium. The method may include: displaying, during a chat session between a first user and a second user, a video of the first user or an animation representing the first user. This feature of the method may be performed on an end user device of the second user. The method may further include receiving user input on the end user device of the second user, wherein the user input indicates selection of the first user, or selection of an avatar representing the first user; and generating, by the end user device of the second user, a message for transmission to an end user device of the first user, wherein the message indicates that a haptic effect is to be generated on the end user device of the first user, wherein the message is based on the user input received on the end user device of the second user.

Some aspect of the present disclosure relates to a method for providing a chat session among at least a first user and a second user for a chat application. The method may be performed by at least one processor of an end user device, such as may be performed when the at least one processor executes instructions on a non-transitory computer-readable medium. The method may include: determining, by an end user device of the second user, a device capability of an end user device of the first user; and displaying, based on the determined device capability of the end user device of the first user, a video of the first user on the end user device of the second user, or instead displaying an avatar of the first user on the end user device of the second user.

BRIEF DESCRIPTION OF THE DRAWINGS

The foregoing and other features, objects and advantages of the invention will be apparent from the following detailed description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIGS. 2A-2C depict various systems for rendering a haptic effect on a user peripheral device or other end user device, according to an embodiment hereof.

FIG. 7 depicts a flow diagram of an example method for processing media data of a 3D environment so that a haptic effect associated with the 3D environment can be generated, according to an embodiment hereof.

FIGS. 9A-9D illustrate example views of a 3D environment which may be experienced virtually by a user, according to an embodiment hereof.

FIG. 10 illustrates an example of media data which may be used to present a 3D environment for a user, according to an embodiment hereof.

DETAILED DESCRIPTION

Figure 1A:
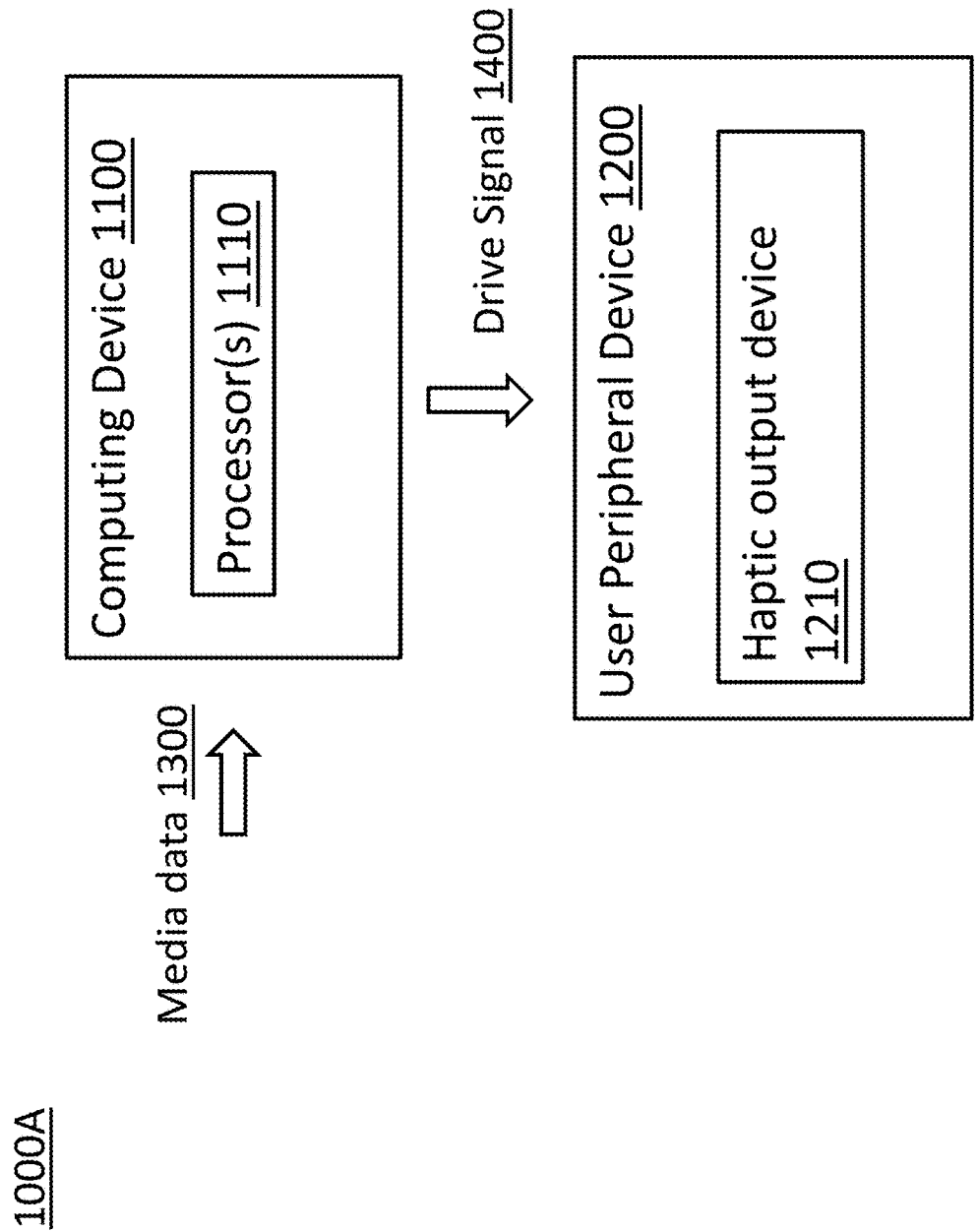
FIGS. 1A-1C depict various systems for rendering a haptic effect associated with a 3D environment described by media data, according to an embodiment hereof.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various aspects of the present disclosure relate to providing a haptic effect for a 3D environment. The 3D environment may present a scene in an omnidirectional manner. The scene may represent, e.g., a physical venue or other physical space, such as a sporting venue or concert venue, or a virtual space, such as a virtual reality (VR) space for a game. The 3D environment may be experienced virtually by a user via a user peripheral device or other end user device, and may be experienced in an immersive manner. In some implementations, the 3D environment may be provided by media data that allows a user to view different portions of the scene and/or to navigate to different portions of the scene. Such content in the media data may be referred to as 3 DoF content or 6 DoF content, because they may allow a user to control a virtual field of view in the 3D environment in three degrees of freedom or six degrees of freedom, as discussed below in more detail. As an example, the media data may include a 360-degree video (e.g., also referred to as a spherical video) which may provide an immersive experience in which a user can view different portions of a scene captured by the video. In some instances, the 360-degree video or other media data may be provided via the MPEG-I standard, which is a standard being developed by the Moving Picture Expert Group (MPEG). For example, the 360-degree video may be generated by various sensors (e.g., one or more cameras and/or one or more microphones) which generate sensor data that capture the scene, such as a sports match or concert, in multiple directions. The sensor data may be encoded into a MPEG-I stream according to the MPEG-I standard, and may be broadcast or otherwise communicated over a network to a user peripheral device or other end user device. The content in the MPEG-I stream may include story-driven content, experience-driven content, event-driven content, and/or interaction-driven content, as discussed below in more detail.

Aspects of the present disclosure relate to generating a haptic effect to provide a more immersive way of experiencing the 360-degree video or other 3D environment. In some implementations, the haptic effect may be provided as part of a framework or architecture that processes MPEG-I media data, such as a MPEG-I media stream. The media data may include, e.g., visual data, audio data, and haptic data, which may, for example, all be payload of the media data. Aspects of the present disclosure relates to including haptic data along with other types of data (e.g., visual data, audio data, etc.) in the MPEG-I media stream. In this example, the haptic data may occupy a same level of hierarchy as the other levels of data in the MPEG-I standard. For instance, the haptic data and the other types of data may all be first-level data in the MPEG-I stream.

In aspects, the haptic effect may be generated in a manner that involves a haptic decoding operation and a haptic rendering operation. In aspects, the haptic decoding operation may involve extracting haptic data from the media data. In aspects, the haptic rendering operation may involve controlling how a haptic output device uses the haptic data to generates a haptic effect. For example, the haptic rendering operation may involve generating a drive signal for the haptic output device.

In some aspects of the present disclosure, the haptic rendering operation may involve generating a drive signal based on how a user is interacting with the immersive scene provided by the media data (e.g., MPEG-I stream). In some instances, the haptic rendering operation may generate the drive signal based on a viewpoint location or a virtual field of view of a user in the immersive scene, or more generally in a 3D environment. The virtual field of view may be controlled by a user, especially for a 3D environment that has 3 DoF or 6 DoF content. Such content may allow a user to change a viewing angle or viewing direction into the scene represented by the 3D environment. Such a change may change an orientation of the virtual field of view, which may cause a haptic effect to change. If the 3D environment includes 6 DoF content, the environment may allow a user to change a viewpoint location from which the virtual field of view is based. This change may allow a user to navigate the 3D environment by moving to different viewpoint locations, which may be virtual locations in the 3D environment. In some aspects, the haptic effect may change based on the viewpoint location.

In some instances, the haptic rendering operation may be based on one or more haptic tracks or haptic profiles. In some instances, the haptic rendering operation may be configured to modulate and/or combine various haptic tracks to generate a haptic effect. In some aspects, the haptic rendering operation may have access to different haptic tracks, which may be associated with different sectors in a scene, different geometry types of an object, different virtual surface features or virtual textures, different nested objects, etc. The rendering of haptic effects is discussed below in more detail.

FIG. 1A illustrates an example system 1000A for providing a haptic effect associated with a three-dimensional (3D) environment. More particularly, the system 1000A may include a computing device 1100 and a user peripheral device 1200. As discussed below in more detail, the 3D environment may depict a virtual environment and/or physical environment, and may be viewable by a user through the computing device 1100, the user peripheral device 1200, and/or some other device. In an aspect of the present disclosure, the 3D environment may be, e.g., a virtual reality (VR) environment, an augmented reality (AR) environment, an extended reality (XR) environment, or some other 3D environment. In some aspects, the 3D environment may provide an omnidirectional view of a scene, in which the user can control a viewing angle at a viewpoint location, which may be a virtual location in the 3D environment. In some instances, if the 3D environment represents a physical space (e.g., a sporting venue, a concert, a park, etc.), the virtual location may correspond to a physical location in the physical space. The viewing angle may be used to control an orientation of a virtual field of view, so as to view different parts of the 3D environment. For example, the 3D environment may be part of a 360 degree video, also referred to as an immersive video or spherical video. The viewpoint may be controlled with multiple degrees of freedom, such as three degrees of freedom (e.g., 3 DoF) or six degrees of freedom (e.g., 6 DoF). The omnidirectional viewpoint may allow the user to experience the 3D environment in an immersive way.

In an embodiment, the computing device 1100 may be configured to facilitate the providing of a haptic effect for experiencing the 3D environment by generating a drive signal 1400 for a haptic output device 1210. More particularly, the computing device 1100 may include one or more processors 1110 that are configured to receive media data 1300 that describes aspects of the 3D environment, and may generate the drive signal 1400 based on the media data 1300. The media data 1300 may have, e.g., an omnidirectional media format (OMAF) for allowing the 3D environment to be viewed in multiple directions, or may have some other format. In some instances, the media data may be generated according to the MPEG-I standard. For example, the media data may be a MPEG-I stream or other media stream which is provided to the computing device 1100 via a network.

In some instances, the one or more processors 1110 may be configured to perform a decoding operation and/or a rendering operation, which are discussed below in more detail. These operations may be used to generate the drive signal 1400 based on the media data 1300. In this example, the haptic output device 1210 may be part of a user peripheral device 1200 (or, more generally, an end user device). The computing device 1100 may communicate the drive signal 1400 to the user peripheral device 1200, which may use the drive signal 1400 to drive the haptic output device 1210, which may generate the haptic effect. In an aspect of the present disclosure, the haptic output device 1210 may be part of the computing device 1100.

In an aspect of the present disclosure, the user peripheral device 1200 may be an end user device that provides a view of the 3D environment, and/or receives user input for controlling user interaction with the 3D environment. For instance, the user peripheral device 1200 may be or include a head-mounted device (HMD) that displays or otherwise presents various portions of a scene represented by the 3D environment. The HMD may change which portion of the 3D environment is displayed based on a user movement or other user input detected by the HMD. In an aspect of the present disclosure, the user peripheral device 1200 may be a handheld device, such as a phone or a game console controller, which may be configured to receive user input for interacting with the 3D environment. The user input may be, e.g., a touch gesture or a movement gesture. If the user peripheral device 1200 is a phone, the phone may also be configured to display or otherwise present different portions of the 3D environment. In an aspect of the present disclosure, the user peripheral device 1200 may be a wearable device.

Figure 1B:
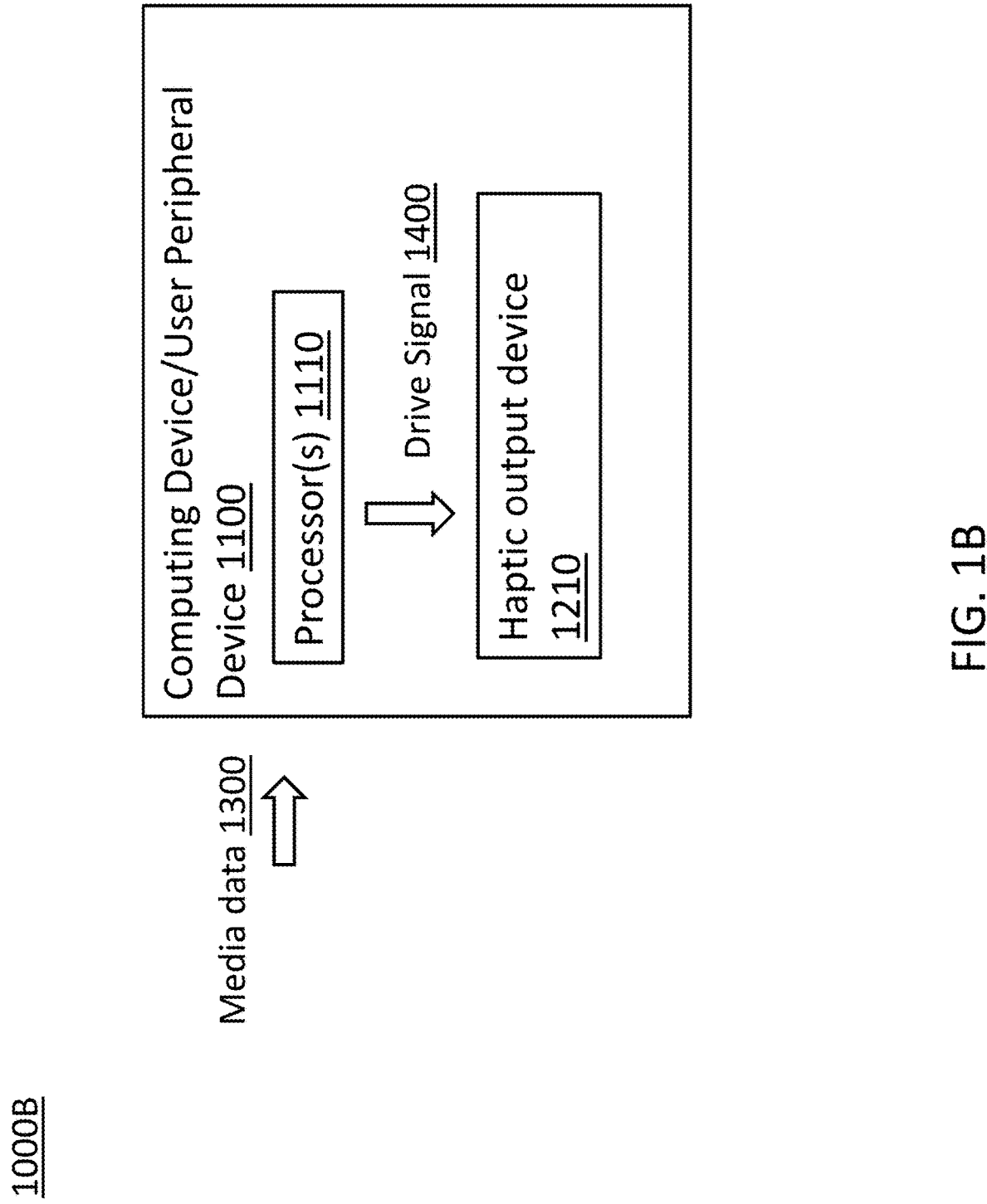

In some aspects, the haptic output device 1210 used to generate a haptic effect for a 3D environment may be part of the computing device 1100. For instance, FIG. 1B illustrates a system 1000B involving a computing system 1100 that includes the one or more processors 1110 and the haptic output device 1210. In this example, the one or more processors 1110 may be configured to generate the drive signal 1400 based on the media data 1300, and to communicate the drive signal 1400 (e.g., via a local bus) to the haptic output device 1210.

Figure 1C:
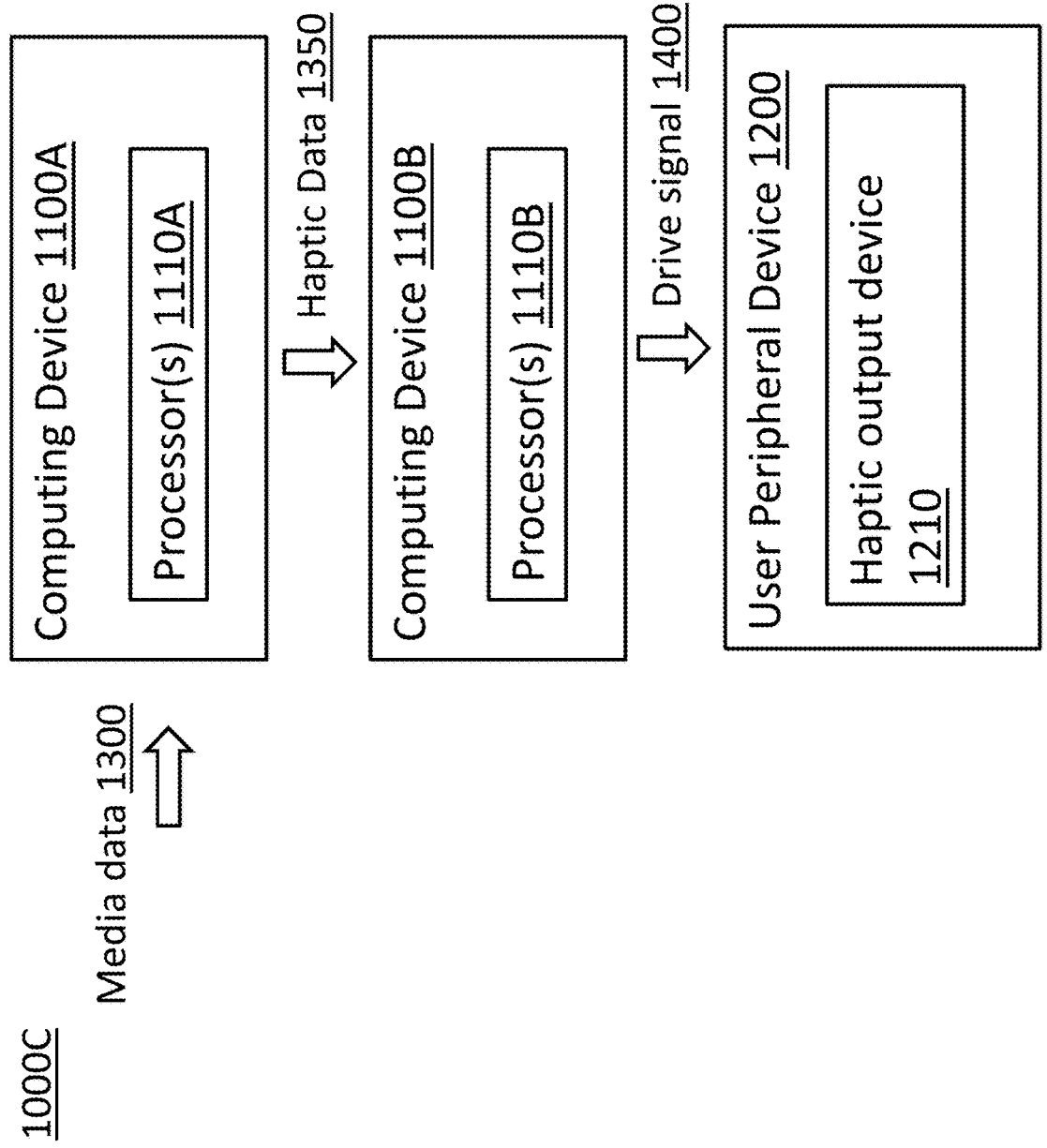

As stated above, the computing device 1100 may be configured to process the media data by performing a decoding operation and/or a rendering operation. In some instances, these two operations may be performed by the same device, such as computing device 1100. In some instances, these two operations may be performed by different devices. For example, FIG. 1C illustrates a system 1000C in which a computing device 1100A performs a decoding operation to extract haptic data 1350 based on the media data 1300, and in which another computing device 1100B generates the drive signal 1400 based on the haptic data 1350. In this scenario, the computing device 1100A may include one or more processors 1110A configured to perform the decoding operation, while the computing device 1100B may include one or more processors configured to perform the rendering operation.

In an aspect, the computing device 1100 may receive the media data 1300 over a network. For instance, FIG. 2A depicts a system 2000A that includes the computing device 1100, the haptic output device 1210, and another computing device 1500. In one example, the media data may represent a physical venue (e.g., sporting venue, museum, etc.) or a performance at the physical venue (e.g., sports match), wherein the physical venue may be remote from the computing device 1100. The media data 1300 may be provided to the computing device 1100 over a network 1600, which may allow a user of the computing device 1100 to virtually experience the performance or venue. In some instances, the media data may be generated by the computing device 1500. For example, the computing device 1500 may be a server configured to receive various data, such as video data, audio data, and haptic data, and to encode them into one or more data streams that forms the media data 1300. In this example, the server may be configured to, e.g., broadcast the media data 1300 to the computing device 1100 via the network 1600. In some implementations, the media data may be based on sensor data captured at the venue. For example, the media data representing a sporting venue may be based on multiple cameras, which may capture a view of the sporting venue from multiple directions at one or more locations in the sporting venue.

Figure 2B:
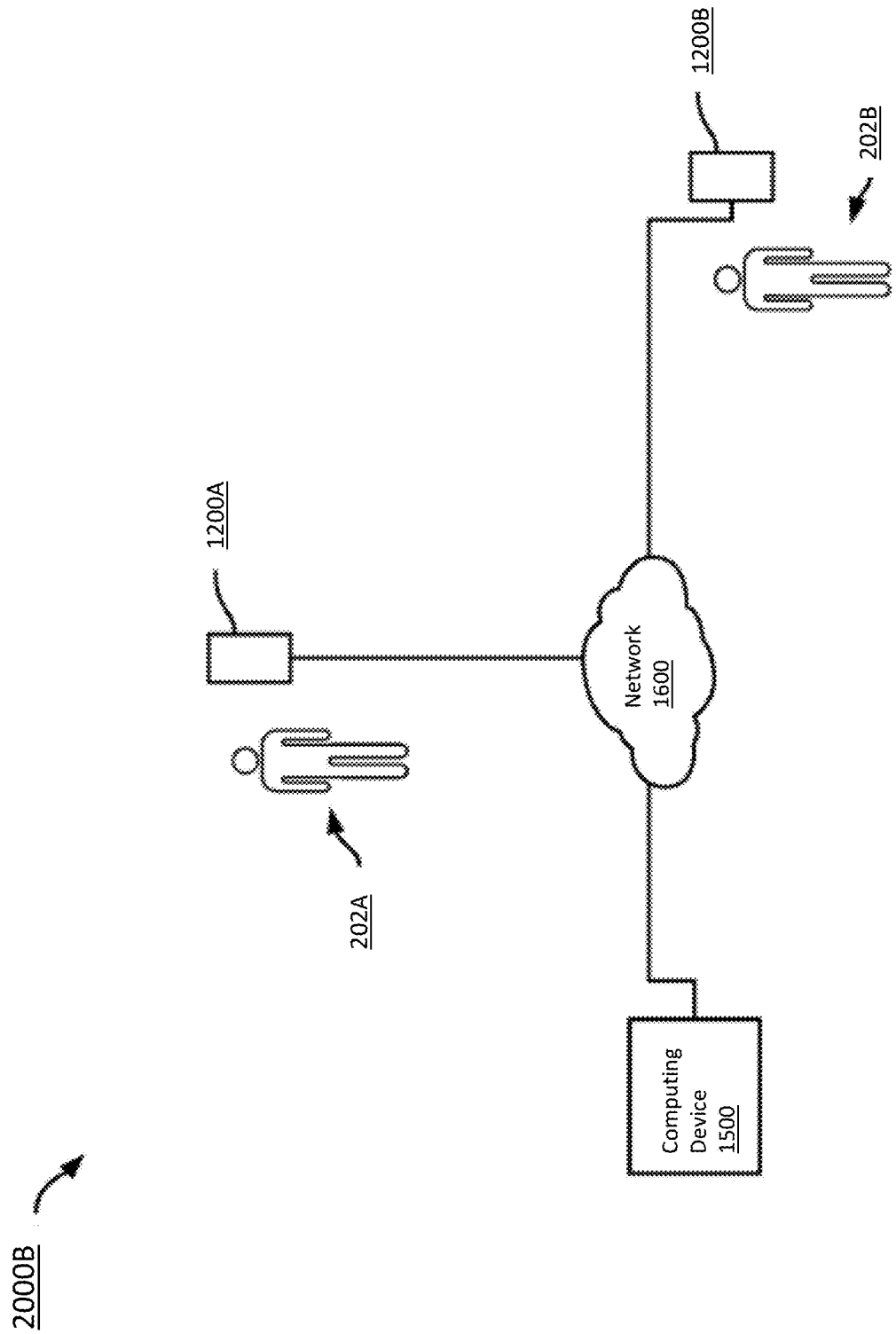
Figure 2C:
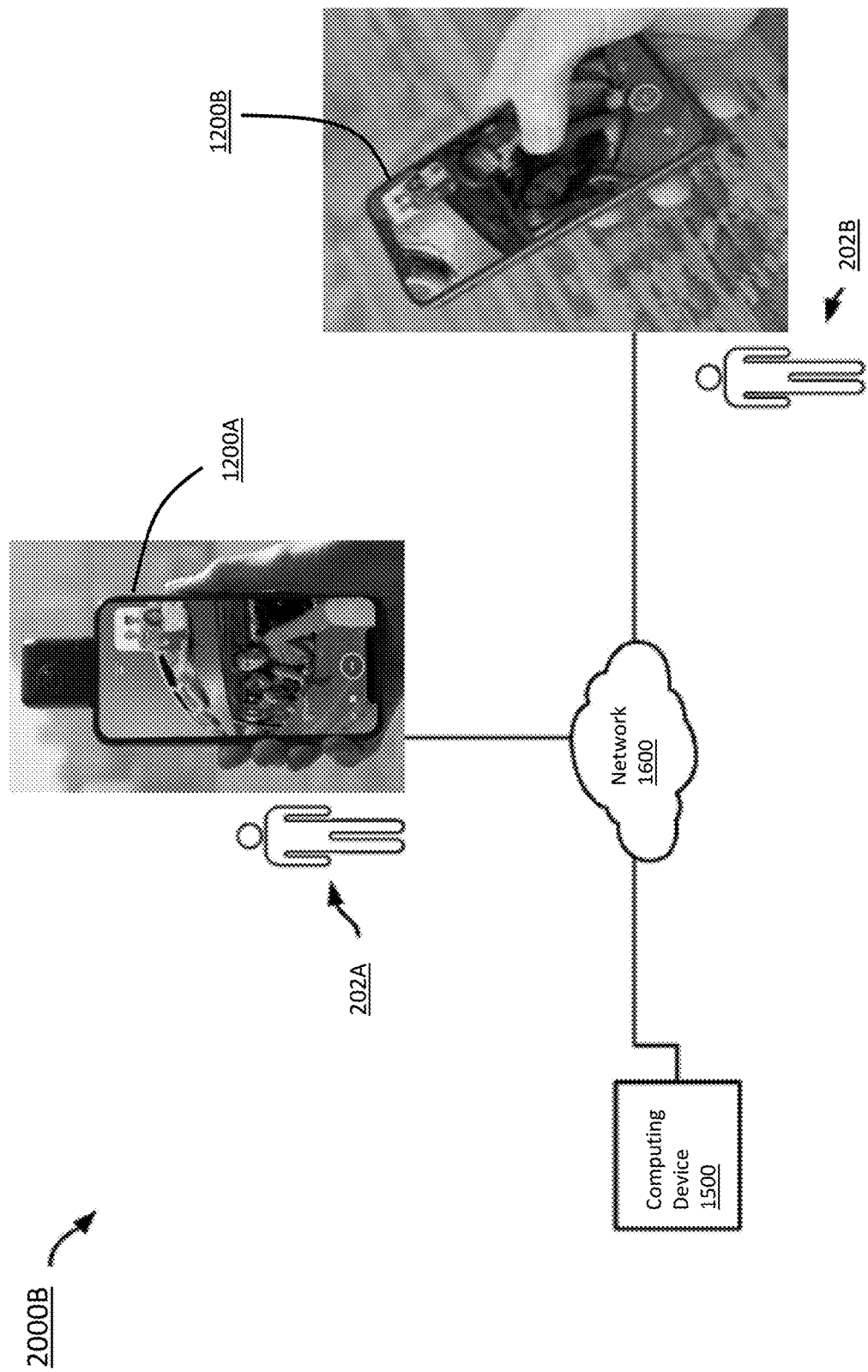

In an aspect of the present disclosure, the network 1600 may be used to support communication between end user devices, such as between users' phones. For instance, FIGS. 2B and 2C illustrate a system 2000B in which a first end user device 1200A and a second end user device 1200B (e.g., which may be remote from each other) may be configured to communicate with each other via the network 1600. As discussed below in more detail, one example of the chat session may include panoramic video calling between the first end user device 1200A and the second end user device 1200B. The first end user device 1200A may belong or otherwise be associated with a first user 202A, while the second end user device 1200B may belong to or otherwise be associated with a second user 202B. In some cases, the communication may be used to create a chat session between the first user 202A and the second user 202B.

In an aspect, one or more of the end user devices 1200A, 1200B may include components such as a display, a speaker, a camera or other light detector, a microphone, a haptic output device, and/or a sensor. In some instances, one or more of the end user devices 1200A, 1200B may include or be a HMD that includes a headset. In such instances, the sensor may track movement of the headset. In such instances, the sensor may track movement of the headset. For example, the sensor may include one or more of an accelerometer or a gyroscope. In the embodiment of FIGS. 2B and 2C, the computing device 1500 may be configured to provide content for the communication between the end user devices 1200A, 1200B. For instance, the computing device 1500 may be a server hosting a chat session between the end user devices 1200A, 1200B. The server may relay communication from the end user device 1200A to the end user device 1200B, and vice versa. In some scenarios, the computing device 1500 may be configured to provide content, such as videos or animations, to the end user devices 1200A, 1200B.

Figure 3:
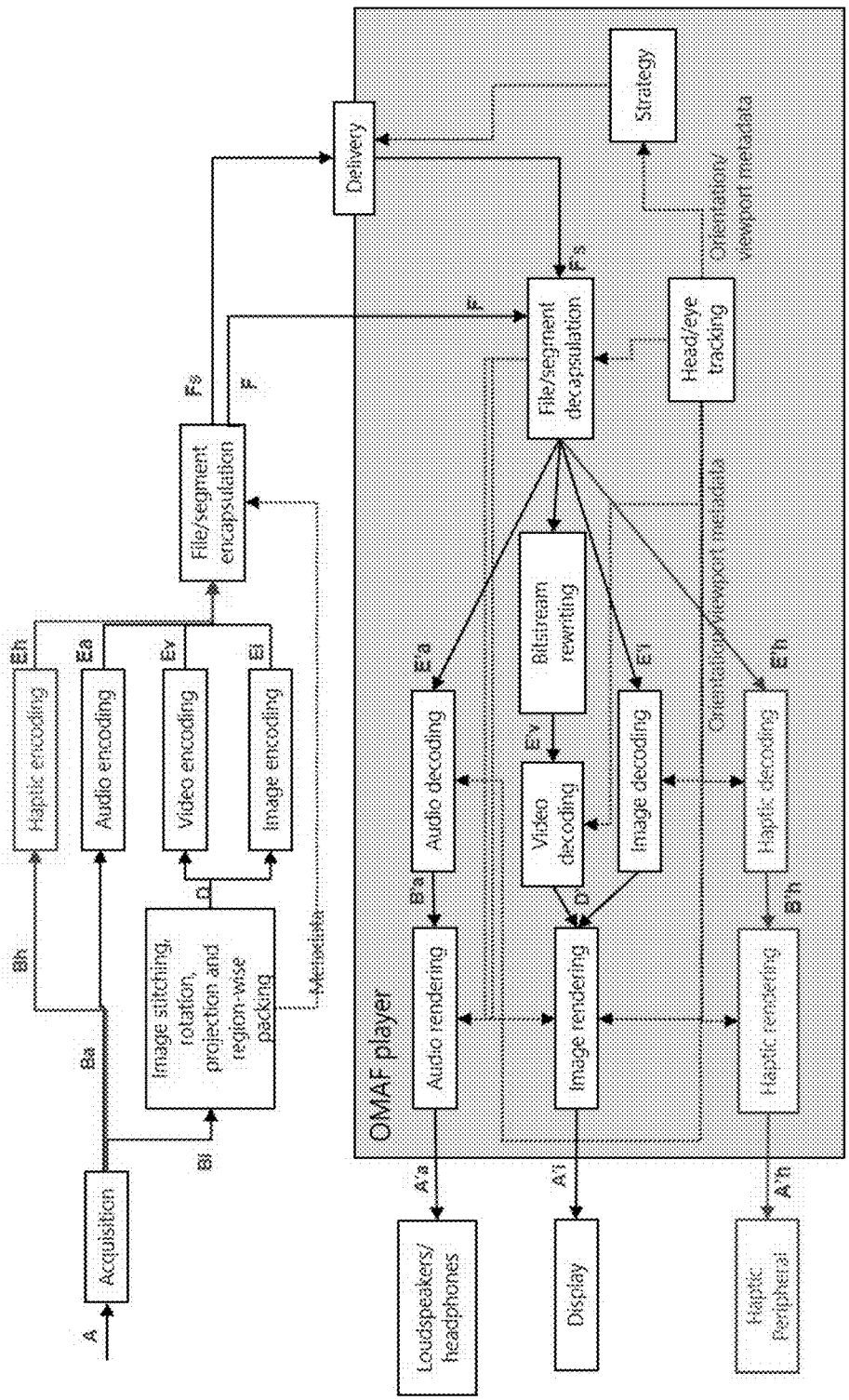
FIG. 3 depicts a system architecture for performing a haptic decoding operation and a haptic rendering operation, according to an embodiment hereof.

In an aspect of the present disclosure, the computing device 1100 of FIGS. 1A-1C may be configured to process media data which is in the omnidirectional media format (OMAF), which may be used to present a 3D environment that can be viewed by a user in an omnidirectional manner. In such an aspect, the computing system 1100 may be or may implement an OMAF player, such as the OMAF player depicted in FIG. 3. In the example of FIG. 3, the OMAF player may be configured to process media data encoded in OMAF.

In an aspect of the present disclosure, the media data may have been created by encoding various sources of data, such as video data, audio data, and haptic data. For instance, FIG. 3 illustrates Bh, which represents a source of haptic data. In some implementations, the source Bh may include sensor data, synthesized data, or other data that describes tactile essence, and/or may conform to a standard such as the Society of Motion Picture and Television Engineers (SMPTE) st2100-1-2017. The source Bh may be encoded by a device, such as computing device 1500, according to a codec, such as Eh in FIG. 3. As depicted in FIG. 3, if the media data includes audio data, the audio data may be encoded in a coded Ea (e.g., MPEG-I stream). If the media data includes video data or includes image data for a still image, the video data or image data may be encoded in a codec Ev and a codec Ei, respectively, into file data. In the example of FIG. 3, a device (e.g., computing device 1500) may encapsulate and/or store the media data, which may include the encoded haptic data, audio data, video data, and/or image data, in a file format such as the International Standards Organization Base Media File Format (ISOBMFF). In such an example, the media data may be encoded into an ISOBMFF file F/Fs.

In an aspect, an OMAF player such as the computing device 1100 may receive and process (e.g., decapsulate) the file F/Fs, such as the ISOBMFF file, which may include file data that encodes the media data. More particularly, the processed file data may include encoded haptic data E'h, encoded audio data E'a, and/or encoded video data E'v. In some implementations, the OMAF player may be configured to decode various encoded data using a codec. For instance, the OMAF player may decode the encoded haptic data E'h into decoded haptic data B'h. The decoding may be, e.g., based on the codec Eh.

In an aspect, the OMAF player may be configured to provide the decoded haptic data B'h to a haptic rendering module, which may be configured to generate a drive signal for a haptic output device (e.g., 1210). In some instances, generating the drive signal may involve converting the decoded haptic data B'h into a peripheral specific format A'h and using an application specific interface (API) of a peripheral device (e.g., 1200) to render the haptic data in concert with audio data and video data, and/or with user state information.

In some aspects, the example in FIG. 3 may involve media encoding that places alternate haptic tracks or other haptic data in the same stream as audio/video data. This scenario may rely on the OMAF player to parse and allocate these alternate haptic tracks depending on which device or devices will generate a haptic effect. More specifically, the OMAF player may parse the encoded media data based on how many haptic output devices are available to generate a haptic effect, and a device type for the available haptic output device(s). In some aspects, the media data may include a Media Description Presentation (MPD) that describes distinct choices of haptic tracks for a particular media stream. A user or the OMAF player may be able to select a particular haptic track.

Figure 4:
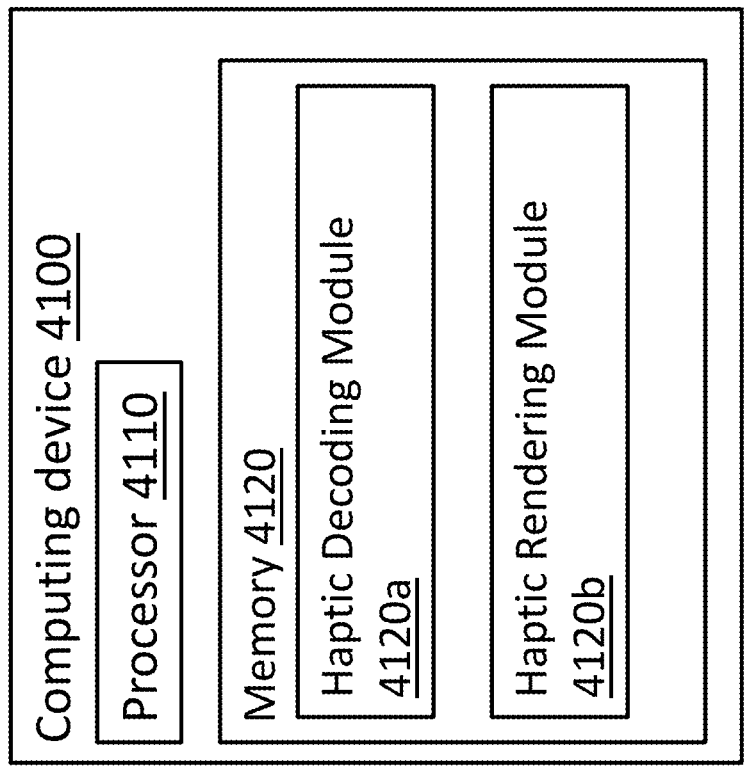
FIG. 4 depicts a block diagram of an example computing device which may perform a method that facilitates the generating a haptic effect, according to an embodiment hereof.

As stated above, the decoding and/or rendering of media data may be performed by the computing device 1100 of FIGS. 1A-1C. FIG. 4 illustrates a computing device 4100, which may be an embodiment of the computing device 1100. In this embodiment, the computing device 4100 may include at least one processor 4110 and a memory 4120. In an aspect of the present disclosure, the computing device 4100 may be a server, a personal computing device (e.g., a laptop or tablet computer), a phone or other mobile device, or a user peripheral device (e.g., a HMD). More specifically, the computing device 4100 may in some instances be a device in communication with a user peripheral device, so as to cause a haptic effect at the user peripheral device. In some instances, the computing device 4100 may include or itself be a user peripheral device that includes a haptic output device, which may be configured to generate a haptic effect at the computing device.

In some aspects, the memory 4120 may include a haptic decoding module 4120a and a haptic decoding module 4120b. More particularly, the memory 4120 may include dynamic random access memory, a solid state device, a hard disk drive, or any other non-transitory computer-readable medium. The modules 4120a, 4120b may include instructions which may be executed by the processor 4110 to execute a haptic decoding operation and a haptic rendering operation, respectively. As discussed below in more detail, the haptic decoding operation may involve extracting haptic data from media data, and/or the haptic rendering operation may involve using the haptic data to generate a drive signal for a particular user peripheral device, a particular haptic output device, and/or a particular situation.

Figure 5:
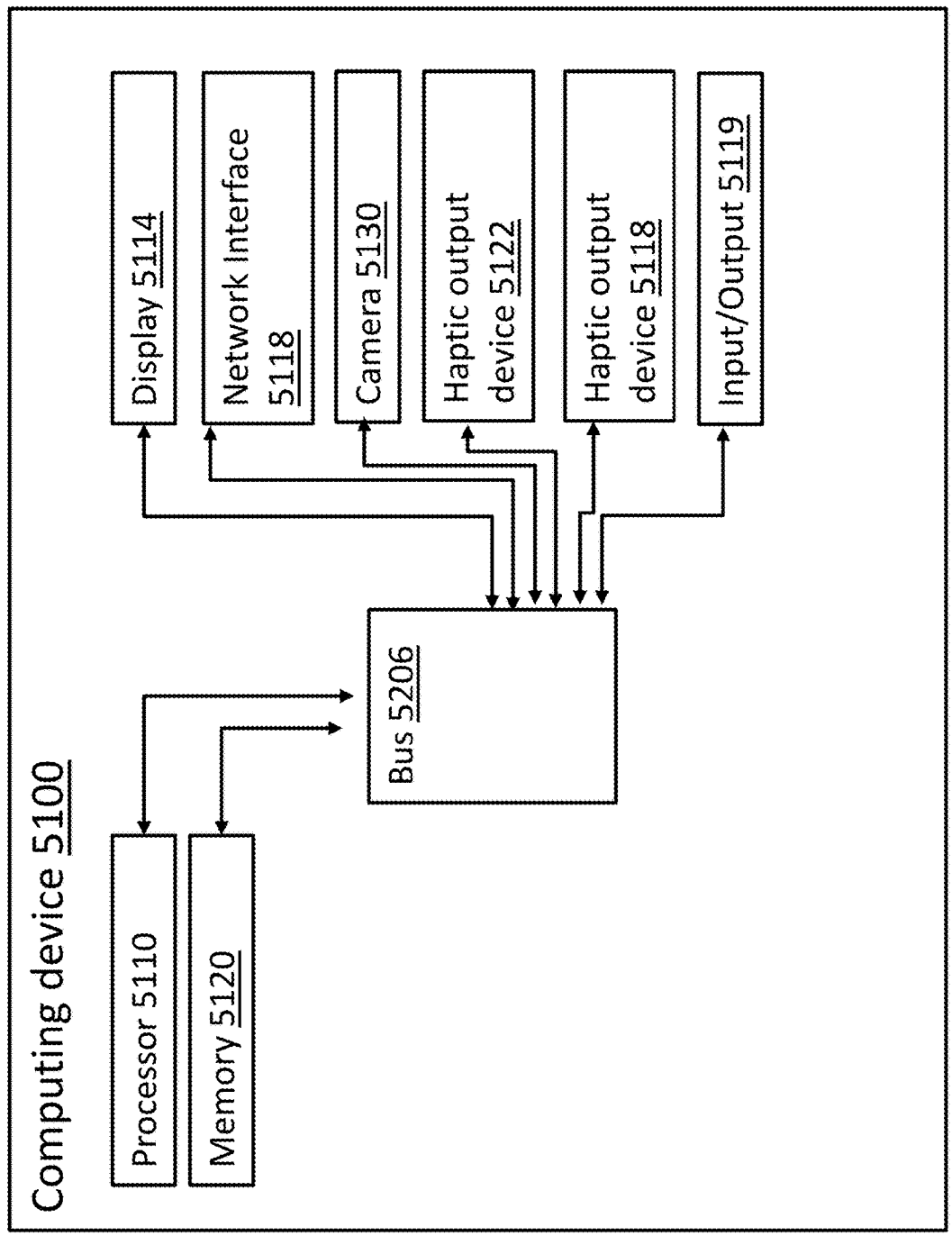
FIG. 5 depicts a block diagram of an example computing device which may perform a method that facilitates the generating a haptic effect, according to an embodiment hereof.

FIG. 5 illustrates an example of a computing device 5100, which may also be an embodiment of the computing device 1100. In this example, the computing device 5100 may be, e.g., a personal computer, a mobile device, a wearable device such as a HMD, a handheld device, or some other computing device. The computing device 5100 may be configured to present a 3D environment, such as a VR environment, AR environment, or XR environment to a user. As depicted in FIG. 5, the computing device may include at least one processor 5110, a memory 5120, a display device 5114, a network interface 5118, a camera 5130, a haptic output device 5122, a haptic output device 5118, and an input/output (I/O) device 5119. These components may be configured to communicate via a bus 5206.

In some aspects, the at least one processor 5110 may include a microprocessor, a digital signal processor (DSP), an application-specific integrated circuit (ASIC), field programmable gate arrays (FPGAs), a programmable logic controller (PLC), and/or state machines. In some implementations, the at least one processor 5110 may include a programmable electronic device such as a programmable logic controller. The processor 5110 may be in communication with the memory 5120.

In some aspects, the memory 5120 may include a non-transitory computer-readable medium, such as random access memory ("RAM"), read-only memory ("ROM"), erasable and programmable read-only memory ("EEPROM"), or the like. As discussed above with respect to FIG. 4, the memory 5120 may store program components that configure operation of the computing device 5100. In some aspects, the network interface device 5118 may be configured to facilitate a network connection. As an example, the network interface device 5118 may include a wired interface, such as an Ethernet, USB, IEEE 1394 communication component, and/or a wireless interface, such as an IEEE 802.11, Bluetooth, or radio frequency (RF) communication component (e.g., a RF component for accessing cellular telephone networks).

In some aspects, the I/O device 5119 may be configured to facilitate wired or wireless connections to various devices, such as the display device 5114, a game controller, a keyboard, a computer mouse, or a joystick. In some aspects, the I/O device 5119 may be configured to facilitate a communication connection with the camera 5130, a microphone, and/or other hardware component.

In some aspects, the computing device 5100 may include a touch surface (e.g., a touchpad or touch sensitive surface) that can be communicatively connected to the bus 5206. The touch surface may be configured to sense tactile input of a user. In some implementations, the touch surface may include one or more touch sensors such as resistive and/or capacitive sensors that can be embedded in touch surface. The touch surface may be configured to detect or measure location of a touch input, and/or other information about the touch input, such as an amount of pressure, speed of a touch gesture, and/or a direction of the touch gesture.

In some aspects, the display device 5114 may be touch-sensitive. For instance, the display device 5114 may be overlaid with the touch surface, or may include a layer that is configured to sense a touch gesture or other touch input. In some aspects, the display 5114 may be used by the computing device 5100 to provide a graphical user interface (GUI).

In some aspects, the computing device 5100 may include a sensor configured to measure motion of the computing device 5100. In this example, the computing device 5100 may be a portable device which may be moved by a user, such that the sensor may be configured to measure or otherwise detect motion of the user, or a part of the user (e.g., user's arm, leg, or head). In some implementations, the sensor may include a gyroscope, an accelerometer, a magnetometer, a microphone, a force or pressure sensor, and/or any other sensor that can detect, monitor, or otherwise capture information about a user's motion. In some instances, the sensor may be a wearable sensor, a handheld sensor, or any sensor that can be coupled (e.g., attached) to a user or otherwise associated with the user or a part of the user. If the sensor is attached to a specific part of a user's body, such as the user's arm or leg, the sensor may measure motion of that part of the user. In some implementations, the sensor may be a pressure sensor which is configured to sense an amount of pressure created by user contact with a surface. In one example, the sensor may include multiple components for measuring motion in multiple dimensions. For instance, the sensor may include multiple accelerometers for measuring motion in multiple dimensions. If the user is represented by an avatar or other 3D representation, the sensor may detect user input for controlling the avatar.

Figure 6A:
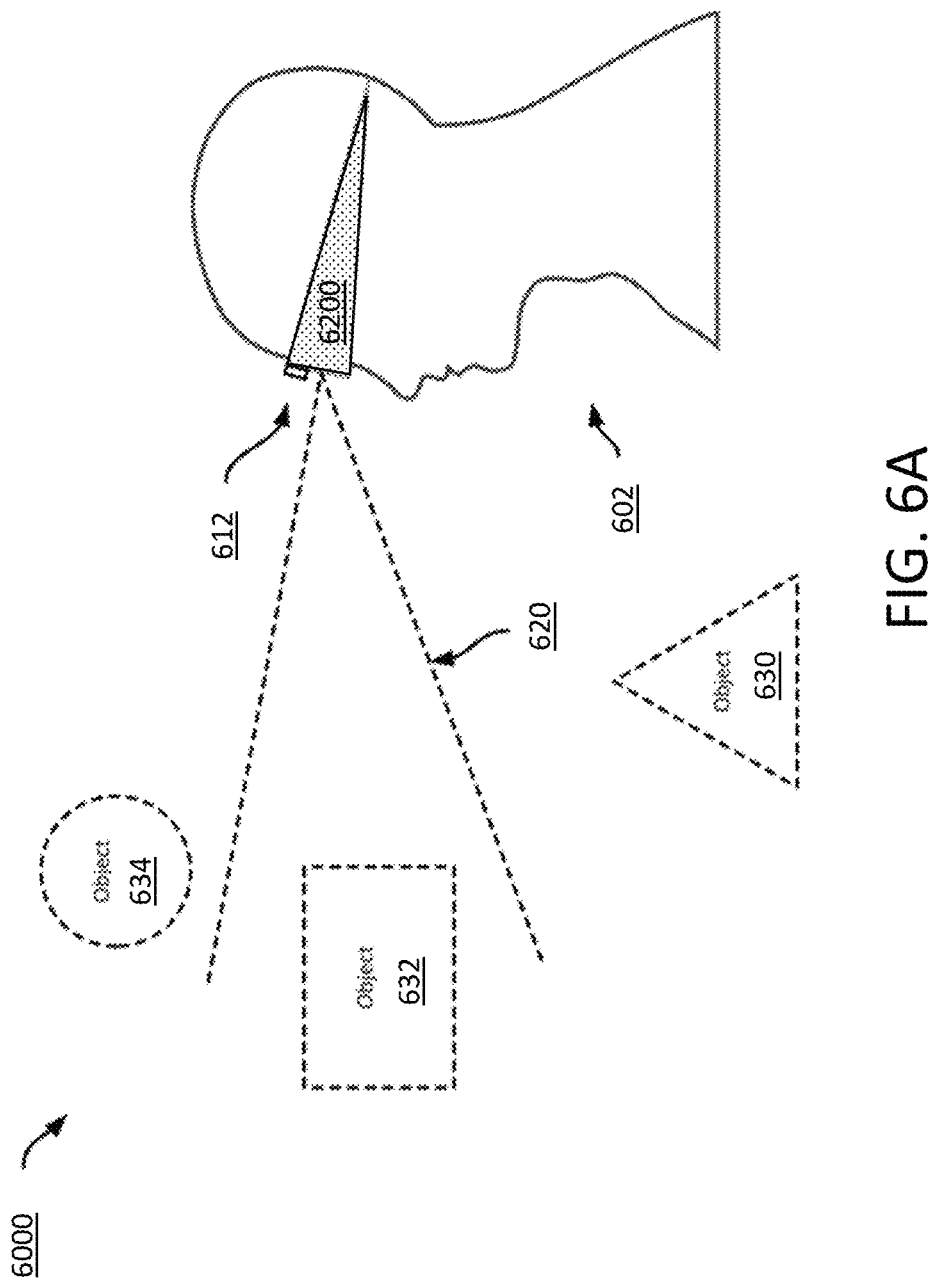
FIGS. 6A-6C depict examples of a user peripheral device or other end user device on which a haptic effect may be generated, according to an embodiment hereof.

As stated above, the computing device 1100 be a haptic-enabled user peripheral device, or may be in communication with a haptic-enabled user peripheral device, such as device 1200 (e.g., via the wired or wireless communication interface discussed above). In some aspects of the present disclosure, the user peripheral device 1200 may be a wearable device, such as a HMD. For instance, FIG. 6A illustrates a system 6000 that includes a user peripheral device 6200, which may be an embodiment of the user peripheral device 1200. The user peripheral device 6200 may be a HMD, which may include a headset, glasses, and/or some other component. In a more particular example, the HMD may include a VR headset or AR headset. The HMD may include a display device that is configured to display views of a 3D environment, including virtual objects in the 3D environment, such as object 630, 632, and/or 634.

In an embodiment, the user peripheral device 6200 may include a sensor 612 configured to detect eye gaze, line-of-sight, or field of view of a user 602 wearing or otherwise operating the computing device 6200. More specifically, the sensor 612 may be configured to detect a direction of the user's eyes, which may control a viewing angle, or more generally an orientation of a virtual field of view 620 of the user with respect to content (e.g., characters, objects, virtual objects, virtual animations, etc.) in a 3D environment displayed via a display device of the user peripheral device 6200. In this example, the display device of the user peripheral device 6200 may display or otherwise output multiple virtual objects, such as objects 630-634. The specific object or objects which are displayed at a particular point in time may depend on which virtual object falls within the virtual field of view 620. Thus, in this example, the sensor 612 may detect the user's gaze or eye direction and provide such information to a processor (e.g., 1110/4110/5110), which may determine content to be displayed by the user peripheral device 6200.

In the example of FIG. 6, the sensor 612 may include a camera, such as the camera 5130. Such a sensor may be configured to capture an image of the eye of the user of the user peripheral device 6200 (e.g., HMD). A processor may receive the image and determine a direction or gaze at which the user's eyes are pointed, and use such information to determine a virtual field of view of the user relative to content in the 3D environment, such as objects in the 3D environment. In some implementations, the sensor 612 may be configured to monitor movements of an eye of the user or muscles near an eye of the user of the device 6200.

In some instances, the sensor 612 may be configured to detect a movement gesture, such as a head gesture or other body gesture. In this example, the user peripheral device 6200 may include a headset which a user may wear. The user may change an orientation of his or her head or other body part to change a virtual field of view, viewing angle, or viewpoint location in the 3D environment.

In some aspects, the user peripheral device 6200 may include a haptic output device, such as the haptic output device 5118. The haptic output device may be configured to generate a haptic effect at the user peripheral device 6200.

The haptic effect may include, e.g., a vibrotactile haptic effect, a kinesthetic haptic effect, an electrostatic friction (ESF) effect, a deformation effect (e.g., a squeeze effect or poke effect), a temperature-based effect, a pneumatic-based effect, and/or some other haptic effect.

In some aspects, the haptic output device in the user peripheral device 6200 or in any other device may include, e.g., a piezoelectric actuator, an electric motor, an electromagnetic actuator, a voice coil, a shape memory alloy, an electro-active polymer, a solenoid, an eccentric rotating mass motor (ERM), a linear resonant actuator (LRA), a spinning or scalable rotary actuator (SRA), an ultrasonic actuator, a deformation device, an electrostatic actuator, a shape memory material (SMA) actuator, electroactive polymer (EAP) actuator, a macro-fiber composite (MFC) actuator, a solenoid resonance actuator, a Peltier device, a pneumatic pump, or any other haptic output device.

In some cases, the haptic output device may be integrated into the user peripheral device 6200, and may generate a tactile sensation or other haptic effect which may be felt by a person's face via a strap, eye cover, or other portion of the user peripheral device 6200. In this modality, the haptic effect at the user peripheral device 6200 may indicate presence of a simulated environmental condition, such as rain or snow in a 3D environment representing a remote location, or an explosion in a 3D environment representing a game. Such a haptic effect may allow a user to feel more immersed in the 3D environment.

Figure 6C:
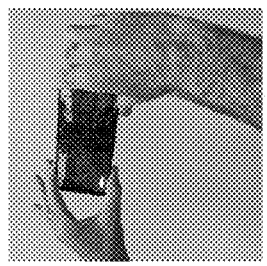
Figure 6B:
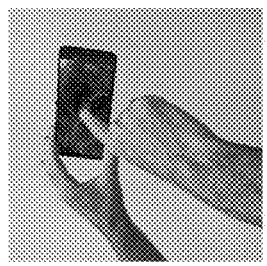

In some aspects of the present disclosure, a 3D environment may be presented via a user peripheral device that is a mobile device, such as a phone or tablet computer. For example, FIGS. 6B and 6C illustrate the user peripheral device being a mobile device. The user peripheral device in this example may include a display device which is configured to display at least a portion of scene represented by a 3D environment. The user peripheral device may be configured to change which portion of the scene or portion or 3D environment is displayed based on user input which adjusts a virtual field of view of a user relative to content in the 3D environment. For example, the user input may adjust a viewing angle, which may change a direction at which the user is looking into in the 3D environment. The user input may include a touch gesture, as illustrated in FIG. 6B, or via a movement gesture, as illustrated in FIG. 6C.

In some aspects, the touch gesture may include a finger gesture. The finger gesture may be used to, e.g., control orientation of a virtual field of view or virtual point of view in a 3D environment. In one example, the finger gesture may involve dragging, tapping, or otherwise touching an image on the user peripheral device of FIG. 6B to change a virtual field of view or virtual point of view. In some instances, a haptic effect may be generated by the user peripheral device, and felt in a supporting hand as well as in a fingertip of the primary hand making the finger gesture.

In some aspects, the movement gesture may include moving the user peripheral device, such as the device of FIG. 6C, to change its orientation. For instance, the user peripheral device may be moved in space to follow a scanning motion that scans a 3D environment. The movement may cause a change in location and/or orientation of the user peripheral device, which may change a direction at which the user peripheral device is pointed. The user peripheral device may sense such a change, which may be used to determine a viewing angle, or more specifically an orientation of a virtual field of view. In some aspects, a haptic effect which is generated at the user peripheral device may be felt by both hands. In some implementations, if the haptic effect is triggered by action in the 3D environment, it may correlate to certain parts of the action, such as the most prominent action which falls within a virtual field of view.

Figure 8A:
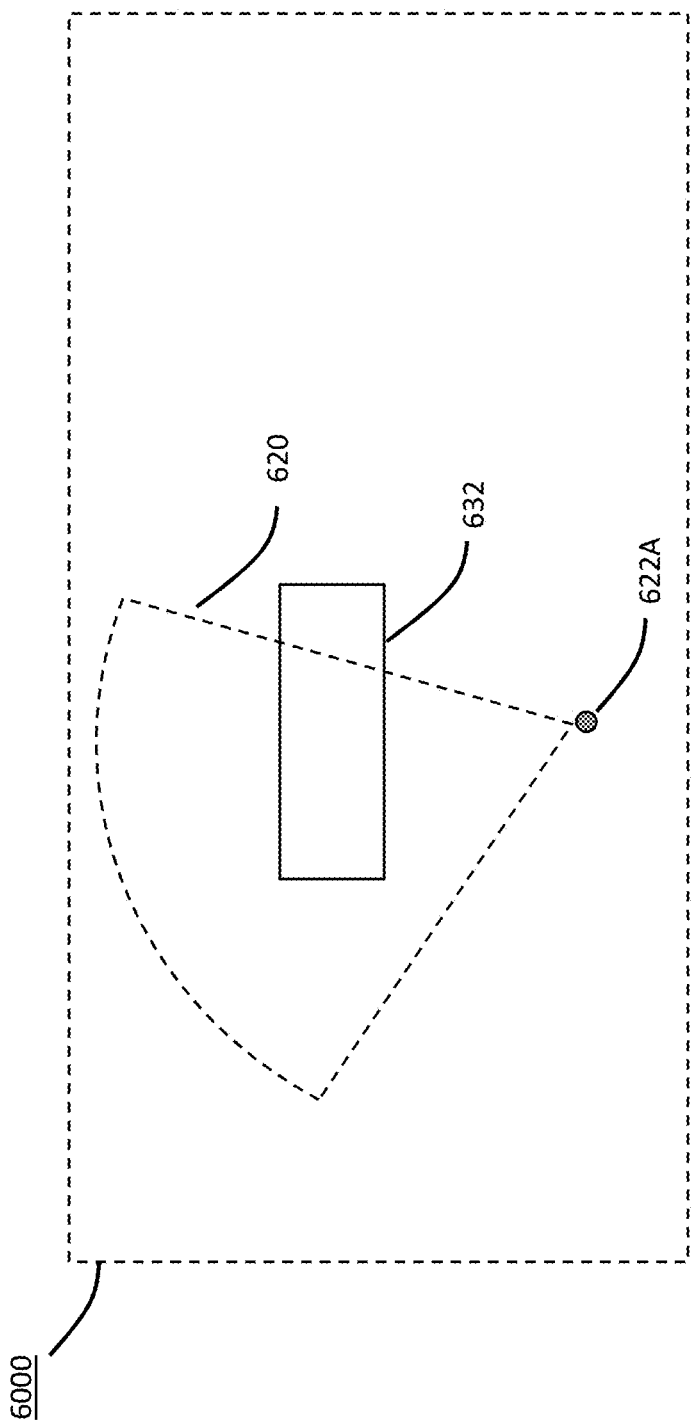
FIGS. 8A-8D illustrate example views of a 3D environment which may be experienced virtually by a user, according to an embodiment hereof.
Figure 8B:
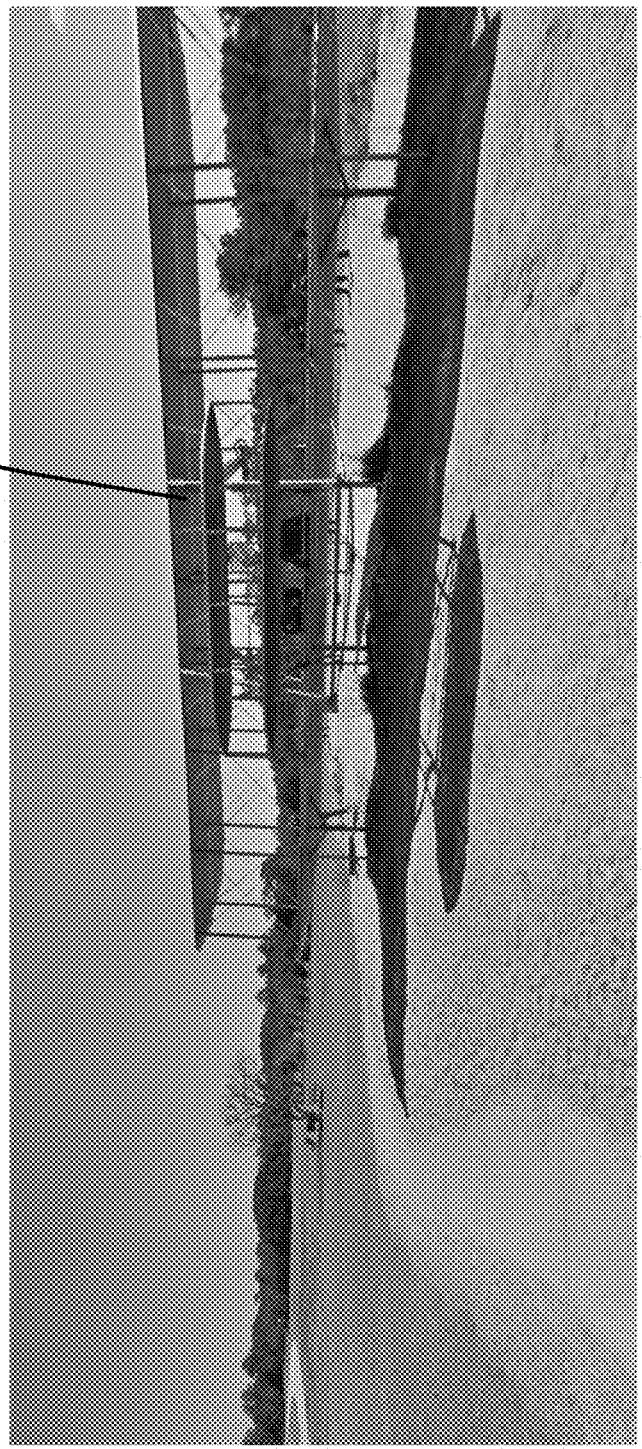

FIG. 7 depicts an example flow diagram for a method 7000 for processing media data, such as media data describing a 360 degree video, an omnidirectional VR environment, or other 3D environment, so as to facilitate the generating of a haptic effect associated with the 3D environment. As stated above, the 3D environment may be an omnidirectional environment that depicts a scene around a virtual location of the user in the 3D environment. For instance, the 3D environment may represent a scene that surrounds a particular location in all directions, wherein the location may be a virtual location (e.g., also referred to as viewpoint location) in the 3D environment. If the 3D environment represents a physical space, the virtual location may correspond to a physical location in the physical space. If the user is represented in the 3D environment by an avatar, the 3D environment may represent a scene that surrounds the avatar in all directions. As an example, FIG. 8A depicts a 3D environment 6000 that may be presented to a user via a user peripheral device (e.g., user peripheral device 6200). In this example, the user peripheral device may present a view of the 3D environment that is based on a location 622A of the user in the 3D environment and based on an orientation of a virtual field of view 620 at that location 622A. If an object (e.g. 632) or other portion of the 3D environment falls within the virtual field of view 620, then the user peripheral device 6200 may display or otherwise present the object 632. For example, FIG. 8B illustrates an example view which the user peripheral device may present to a user. This view may represent a portion of a 3D environment, and may include the object 632, which may fall at least partially within the virtual field of view 620.

Figure 8C:
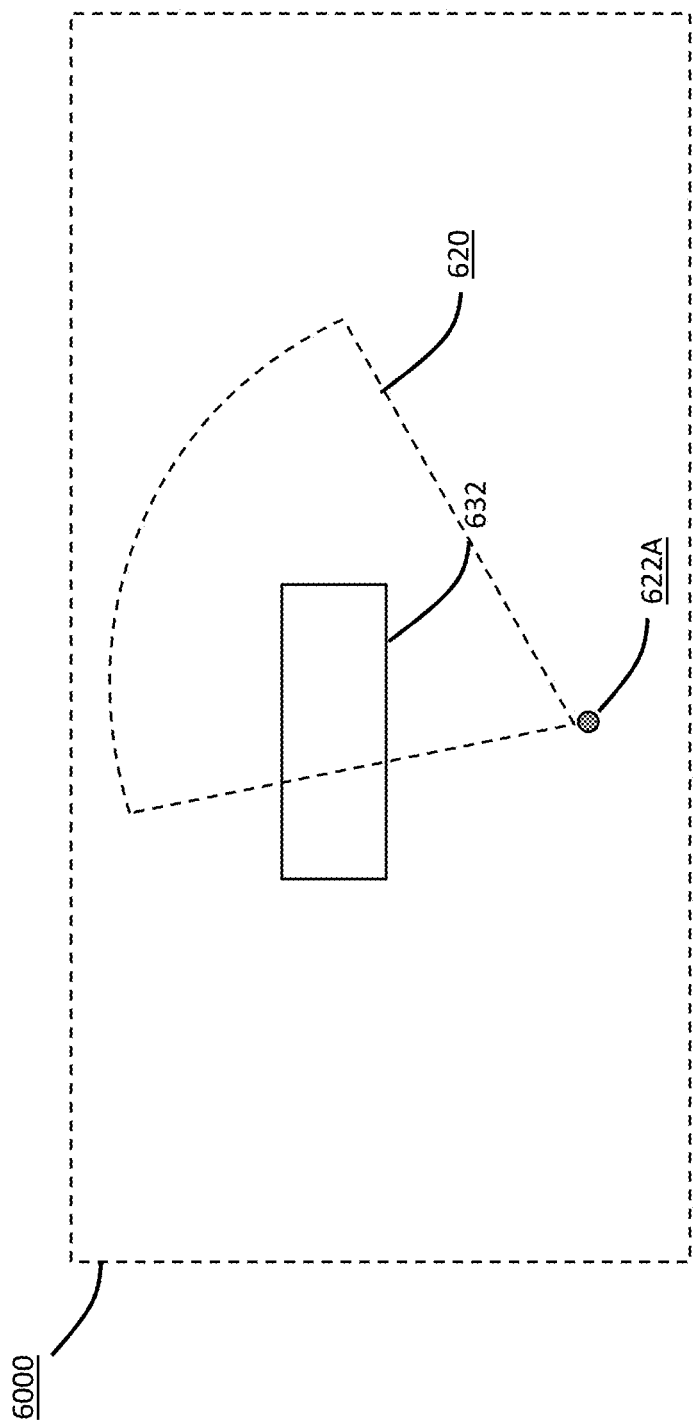
Figure 8D:
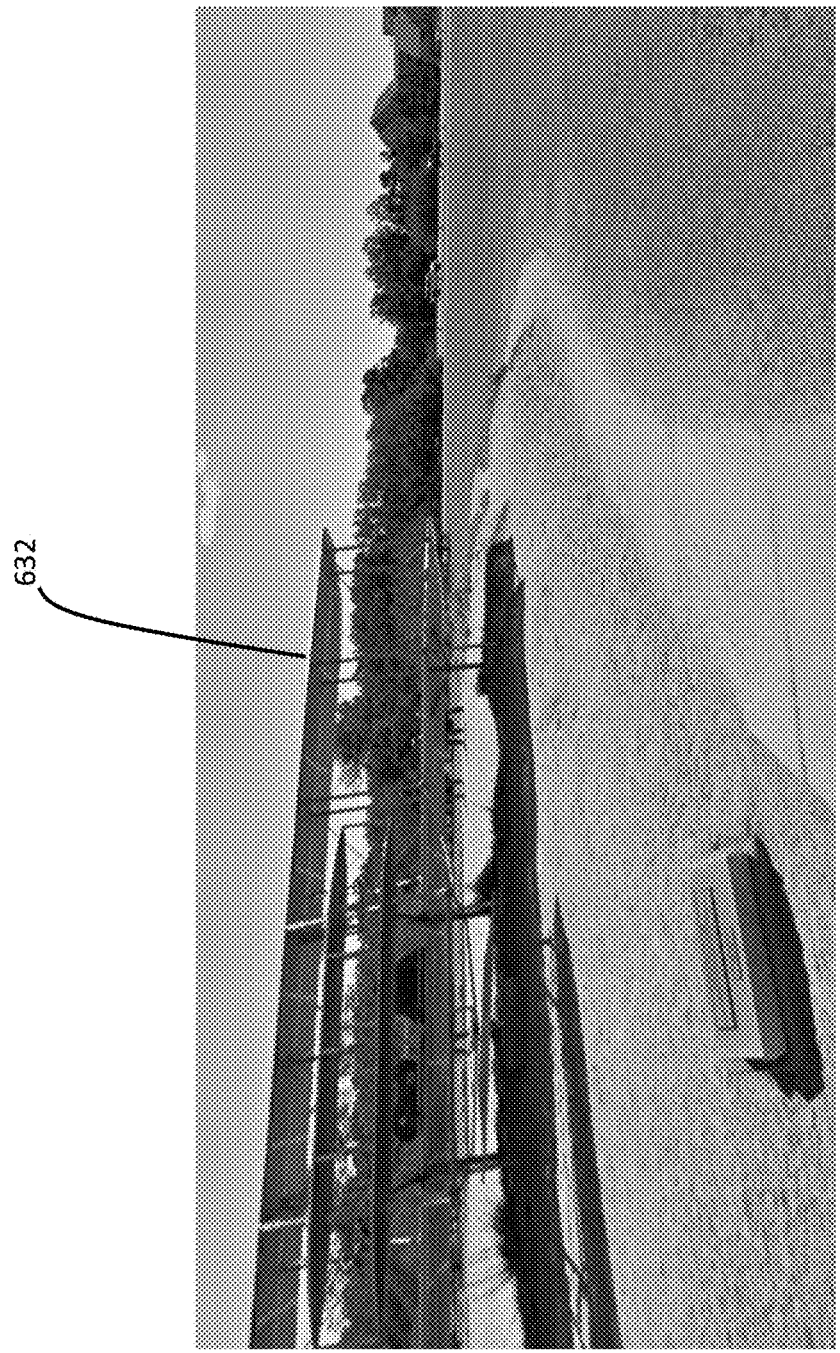

In some aspects of the present disclosure, the user may be able to view different portions of the scene by controlling a viewing angle, or more specifically an orientation of a virtual field of view of a user in the 3D environment. For example, the user may be able to use a control gesture to change a roll, pitch, and/or yaw of a virtual field of view of the user, in at least 3 degrees of freedom. If the user is represented by an avatar in the 3D environment, the control gesture may cause a head of the avatar to turn, which may change a direction along which the avatar is looking. As an example, FIG. 8C illustrates the virtual field of view 620 being turned to the right via a control gesture. This change in the virtual field of view 620 may cause the user peripheral device to display a different portion of the 3D environment to the user. For instance, FIG. 8D illustrates a displayed view of a portion of the 3D environment 6000 that falls within the changed virtual field of view 620.

Figure 9B:

In some instances, the user may be able to change the virtual location from which the 3D environment is viewed. For instance, while the 3D environment 6000 may be viewed from the location 622A, some implementations may allow the user to move in the 3D environment (e.g., via movement of an avatar) to other locations, such as a location 622B or location 622C in FIG. 9A. The movement may be, e.g., along a X, Y, and/or Z axis in the 3D environment. The virtual field of view of the user may be centered around the new location 622B/622C to which the user has moved. FIG. 9B depicts an example of a view which the user peripheral device may display when the user is virtually at the location 622C in the 3D environment and has the virtual field of view 620 from that location 622C. In this example, the view presented by the user peripheral device may be based on controlling a location of a user in the 3D environment in three degrees of freedom (e.g., X axis, Y axis, and Z axis), and may be based on controlling an orientation of a virtual field of view at that location in another three degrees of freedom (e.g., roll, pitch, yaw). In such an example, the view of the 3D environment, or more specifically which portion of the 3D environment is viewed, may be controlled with six degrees of freedom (6 DoF).

Figure 9D:
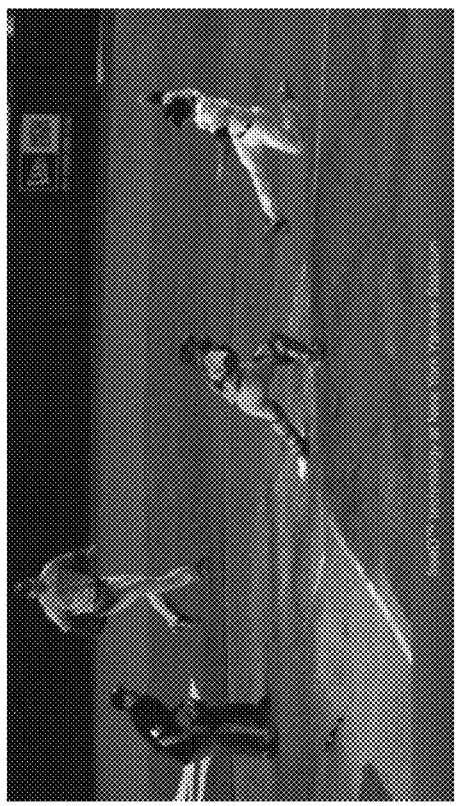
Figure 9C:
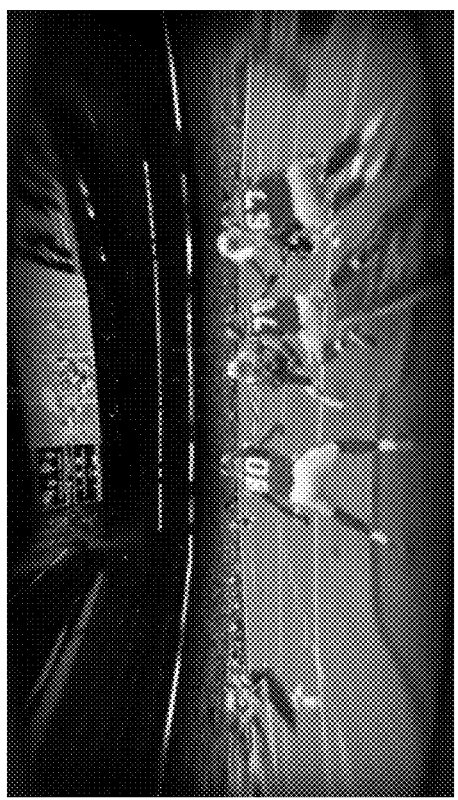

In some aspects, a 3D environment may provide an omnidirectional view of a venue, such as a museum, sporting venue, or concert venue. In some instances, the 3D environment may provide a view of a performance at the venue, such as a sports match, concert, or other performance event. For instance, FIG. 9C illustrates an example of a 3D environment which provides a first person perspective of a sports match while FIG. 9D illustrates an example of a 3D environment which provides a third person perspective of a sports match. In some aspects, a user peripheral device which is presenting the 3D environment to a user may allow the user to change his or her perspective, such as between a first person perspective and a third person perspective.

In some instances, the 3D environment may presented via a 360-degree video or a 360-degree image. As discussed below in more detail, the 360-degree video may include story-driven content, experience-driven content, event-driven content, and/or interaction-driven content. In some instances, the 3D environment may be part of a VR environment, AR environment, or XR environment.

Returning to method 7000, which involves processing media data describing a 3D environment, the method may be performed by a computing device, such as the computing device 1100 of FIGS. 1A-1C, or more specifically by at least one processor of the computing device, such as the processor 1110. For instance, the method may be performed when the processor 1110 executes instructions stored in computer memory, such as instructions stored in the haptic decoding module 4120*a* and the haptic rendering module 4120*b*.

In some aspects, the method 7000 may include an operation 7002, in which a processor (e.g., 1110) receives media data that describes a 3D environment, such as the 3D environment illustrated above. In some instances, the media data may be encoded and received in accordance with the MPEG-I standard. In some aspects, the media data may be part of a media stream. As an example of operation 7002, FIG. 10 depicts a scenario in which the computing device 1100 receives media data 1300. In this example, the media data 1300 may be received from another computing device 1500 via a network 1600. More particularly, the computing device 1500 may, for example, have generated the media data 1300, and may have broadcasted or otherwise communicated the media data 1300 to the network 1600, which may relay the media data 1300 to the computing device 1100.

In some aspects, the media data 1300 received in operation 7002 may include haptic data, such as haptic data 1330 in FIG. 10, that describes a haptic characteristic associated with at least one object, structure, or event in the 3D environment. As one example, if the 3D environment represents a particular venue or other physical space (e.g., via a 360-degree video), the object may be, e.g., a statute, vehicle, or other object at that venue, while the structure may be, e.g., a wall or other structure at the venue. In one example, if the 3D environment is part of a VR environment of a game, the event may be, e.g., an explosion in the game, a collision with an object in the game, or some other event.

In some aspects of the present disclosure, the haptic characteristic may describe a tactile sensation associated with the object, structure, or event. For instance, the tactile sensation may indicate or simulate a texture of the object or structure, a thermal property (e.g., temperature) of the object or structure, firmness, and/or a vibration emanating from the object, structure, or event. Thus, the haptic data (e.g., 1330) may in some aspects represent or describe a virtual texture, virtual thermal characteristic, virtual firmness, virtual vibration, or tactile essence. In some implementations, the haptic data may include or may be based on sensor data generated by a sensor at a venue or other physical space. For instance, the sensor may include a microphone configured to capture crowd noise at a sporting venue, a vibration sensor attached to a sports player at the sporting venue and configured to capture vibration experienced by the sports player, a thermometer configured to capture a thermal characteristic at the venue, and/or some other type of sensor. The sensor may generate sensor data that represents tactile essence, as described in SMPTE st2100-1-2017, at the venue. In some instances, the computing device 1500 may be configured to generate the haptic data 1330 based on or including the sensor data, and encode the haptic data into the media data 1300. In some instances, the computing device 1500 may have generated the haptic data based on a machine learning or other computer vision technique based on a visual appearance of an object in the 3D environment.

In some instances, the haptic characteristic may be indicated or represented by a value of a parameter or profile, such as a virtual friction profile used to simulate texture, a virtual thermal profile used to simulate the thermal property, a vibration intensity parameter used to indicate an intensity of vibration, and/or some other parameter. In some instances, the haptic characteristic may be described or represented by a haptic track, such as a waveform which describes vibration intensity as a function of time.

In some aspects, the media data may include visual data and/or audio data as well as haptic data. For example, FIG. 10 illustrates the media data 1300 having a payload which has a first payload portion that includes visual data 1310, a second payload portion that includes the haptic data 1330, and a third payload portion that includes audio data 1320. In some instances, the media data 1330 may be a media stream. In this example, the visual data 1310, the audio data 1320, and the haptic data 1330 may each be a separate stream within the media stream.

In some instances, the haptic data 1330 in FIG. 10 may share a same level of hierarchy as the visual data 1310 and audio data 1320. For instance, if the visual data 1310 and the audio data 1320 have a particular level of hierarchy in a data communication protocol, the haptic data 1330 may have the same level in that hierarchy. If the visual data 1310 and the audio data 1320 are treated as payloads at that level in the data communication protocol, such as the MPEG-I standard, then the haptic data 1330 may also be treated as a payload at that level. In some implementations, the visual data 1310, audio data 1320, and haptic data 1330 may each be the same level (e.g., first level data) in the MPEG-I communication standard.

In some aspects, if the media data includes visual data, the visual data may describe an appearance of the 3D environment in an omnidirectional manner relative to at least one location (e.g., 622A, 622B, 622C, etc.) in the 3D environment, such as the 3D environment illustrated in FIGS. 8A-8D, 9A, and 9B. For instance, the visual data may form a 2D video and/or a 360-degree video. In some aspects, the 360-degree video or other visual data may depict a real-life physical space, and may display imagery or other content captured by one or more cameras at that space. In some implementations, the 360-degree video or other visual data may allow a user to navigate his/her location within a 3D environment provided by the video, freely without limitation (e.g., with 6 DoF), with natural change of the corresponding rendered video (e.g., as well as audio). Such a video may provide a high quality, realistic immersive experience.

As stated above, the 3D environment may in some aspects be part of media data that provides story-driven content, experience-driven content, event-driven content, and/or interaction-driven content. In some aspects, story-driven content may provide an immersive experience that draws the user along a narrative storyline, like that in a TV show or movie. In this type of content, a user peripheral device may automatically shift a location in the 3D environment from which a virtual field of view is based. This shift may represent movement of one or more cameras used to capture a scene represented by the 3D environment. While the user may have the freedom to view the scene in any direction in 360-degrees, there may be one focal point of action that is assumed to be the center of attention. This focal point may be where the action of the story takes place, such as a child playing in a park. Other action in this example may form background action (e.g., leaves in surrounding trees moving with the wind) that may help create a sense of immersion.

In some aspects, experience-driven content may make a user feel like he or she is inside the action of the scene. In some aspects, event-driven content (e.g., for a sporting event or artistic performance) may make the user feel present at a single location in the 3D environment where the action is unfolding. In some implementations, the event-driven content may limit viewing angles to 180 degrees. In some aspects, interaction-driven content may allow a user to participate in the scene. In such aspects, a user input may be detected (e.g., via a game controller) to allow a user to engage with an object in the scene. The scene may be, e.g., rendered by a 3D game engine.

In some aspects, the media data may include point cloud data, which may describe an object (e.g., game object) or structure in the 3D environment. For instance, if the structure is a wall at a venue, the point cloud data may describe a 3D structure of the wall. If the object is a statue, the point cloud data may describe a 3D structure of the statue. In some instances, the point cloud data may provide a texture atlas which describes texture of the object or structure in the 3D environment. For instance, if the point cloud data describes the object 632 of FIGS. 8A-8D, the point cloud data may describe a structure and/or texture of the object 632.

Returning to FIG. 7, the method 7000 may in an embodiment include an operation 7004, in which a computing device (e.g., 1100) performs a haptic decoding operation. The haptic decoding operation may include, e.g., extracting haptic data from the received media data. For instance, the computing device 1100 may extract the haptic data 1330 from the media data 1300. If the media data is encoded in a protocol (e.g., the MPEG-I protocol), the computing device 1100 may be configured to use the protocol to decode the media data. In some instances, if the media data includes packets of data, and if the haptic data 1330 is part of a payload of the packets, the computing system may be configured to perform the haptic decoding operation by extracting the payload, such as by stripping header information from the packets.

Returning to FIG. 7, the method 7000 may in an embodiment include an operation 7006, in which the computing device (e.g., 1100) performs a haptic rendering operation. In some aspects, the haptic rendering operation may include generating a drive signal and communicating the drive signal to a haptic output device in communication with the computing device (or, more specifically, with a processor of the computing device). If the haptic output device is part of a user peripheral device, the drive signal may cause the haptic output device to generate a haptic effect at the user peripheral device.

In some aspects, the drive signal may be generated based on the haptic characteristic described by the haptic data extracted in the haptic decoding operation, and based on at least one of a user viewpoint location or a user field of view. The user viewpoint location in the 3D environment, such as location 622A, 622B, or 622C in FIG. 9A, may be a location at which the user is virtually located in the 3D environment, and/or a location at which a 3D representation (e.g., avatar) of the user is located in the 3D environment. As stated above, some implementations of a user peripheral device may allow a user to change an orientation of a user field of view in the 3D environment (e.g., also referred to as virtual field of view). In such implementations, changing the orientation of the virtual field of view may affect how a haptic effect is rendered. In some aspects, the user peripheral device may allow a user to change the user viewpoint location through movement in the 3D environment, such as movement along a X-axis, Y-axis, and/or Z-axis. As further stated above, some user peripheral devices may allow a user to control a view of the 3D environment with 6 DoF. In such instances, the haptic effect may be affected by user control of the view in 6 DoF.

In some aspects of the present disclosure, the media data received in operation 7002 may include some pre-rendered haptic content. More particularly, the haptic data extracted from the media data may include content which is pre-rendered at a network entity, such as a device in the network 1600, or the computing device 1500. In such an example, the pre-rendered content may be received by the computing device 1100 from the network entity. The pre-rendered content may allow the computing device to more quickly generate the drive signal, which may lead to the haptic output device generating a haptic effect more quickly. Such an implementation may provide a more responsive haptic effect in response to, e.g., an event in the 3D environment which is intended to trigger the haptic effect.

As stated above, the media data may in some instances provide story-driven content, experience-driven content, event-driven content, and/or interaction-driven content. In some aspects, if the media data provides story-driven content, a salient event like an explosion or a crash may trigger a haptic effect, which may enhance drama and/or intensity of the event. In some implementations, a haptic effect may be used to accentuate a moment when a scene changes or when a storyline development takes place. Such a haptic effect may, e.g., emphasize an action of a main character in the story. In some implementations, a haptic effect may correlate to action that is off-axis from an expected viewing angle. This haptic effect may be used as a story element that may prompt a user to look in another direction or to discover some other story element.

In some aspects, if the media data provides experience-driven content, a haptic effect may be generated to heighten a user's sense of immersion without prioritizing one viewing angle over another. In some aspects, if the media data provides an event-driven content, a haptic effect may be generated to heighten excitement of an event by providing ambience. For example, the haptic effect may simulate a vibration from a roaring of a crowd at a sporting venue, or a shaking of the stands at the sporting venue. In some aspects, if the media data provides interaction-driven content, a haptic effect may be generated to simulate interaction between an object in the 3D environment and a portion of an avatar or other 3D representation of the user.

In some aspects, as stated above, the media data which is received in operation 7002 may include visual data describing an appearance of a 3D environment, and/or point cloud data that describes an object or structure in a 3D environment. In such aspects, a computing device performing the haptic rendering operation may support the processing, storage, and storage of multiple different media types. For instance, the computing device may, e.g., cause the multiple media types to be spatially and temporally synchronized, so that the computing device may support simultaneous rendering of a haptic effect based on the visual data and rendering of a haptic effect based on the point cloud data.

As stated above, the media data which is received in operation 7002 may include audio data. For instance, if the media data describes a performance at a remote venue, such as a sports match or a concert, the audio data may describe crowd noise. In some aspects, the haptic data may describe a haptic characteristic associated with the audio data, such as a volume of the crowd noise. In some implementations, the haptic rendering operation may generate a drive signal based on the haptic characteristic associated with the audio data.

In some aspects, the haptic rendering operation may generate a drive signal based on at least one of a device type or device capability of a haptic output device (e.g., 1210) that is used to generate a haptic effect. In other words, the drive signal may be generated in a manner which compensates for the device type or device capability of the haptic output device. The haptic output device may be part of a computing device performing the haptic rendering operation, or may be part of a user peripheral device. In some instances, the device type may indicate, e.g., whether the haptic output device is a piezoelectric actuator, a LRA, a ERM, etc.

In some aspects, if the media data includes 6 DoF content, then the haptic rendering operation may use a combination of the point cloud data and other media data. For instance, if the 6 DoF content captures a performance at a sporting venue or concert venue, the 6 DoF content may be based on video data captured by multiple high resolution cameras. The video data may be used to create a point cloud of a portion of the sporting or convert venue, such as a player present at the sporting venue. The point cloud data may be generated at a computing device at the venue itself, or may be generated at a device which is remote from the venue. In this example, the point cloud data may provide a user with the freedom to navigate within the venue. In some instances, the point cloud data may define a scene boundary, such as a stage at a concert venue or a court at a sporting venue. In some aspects, the point cloud data may represent an object, such as a game ball, or a player at the sporting venue. For example, a subset of the points in a point cloud may be indexed or otherwise associated with a specific object at the venue. In some instances, the visual data included in the media data may represent non-interactive parts of a scene, such as a background in which a sports match is being played or in which a concert is being performed. As a result, a user peripheral device which is presenting the 3D environment may simultaneously present both the point cloud data and the visual data (e.g., video data), which may facilitate an immersive way to experience the sports match or concert.

In some aspects, the computing device performing the haptic rendering operation may support a smooth changing between views, such as from one view containing only video data, to a view which combines point cloud data and video data, or to a view containing only point cloud data. Such smooth changes may be used by rendering devices which allow restricted viewpoint changes, or for playback applications such as some predefined guided viewing. In some instances, sports and concert events may have multiple cameras capturing the event at different locations with different panning trajectories. By supporting the smooth transition of views from video to combined media, the rendering device may cause both the high quality and artistic intent of video captured by the cameras to be portrayed to the user as part of the immersive experience. In some instances, the type of media data which is communicated to a computing device may depend on a user-selected viewpoint.

In some aspects, the haptic rendering operation may involve generating a haptic effect based on the point cloud data. For instance, the haptic data decoded in operation 7004 may include a haptic track which is associated with a set of point cloud data. The haptic track may be generated based on, e.g., sensor data captured by sensor deployed at a venue represented by the 3D environment, wherein the sensor may be configured to capture tactile essence at the venue. The computing device may be configured to generate a drive signal based on the point cloud data. In one example, a subset of points in the point cloud data may be indexed or otherwise associated with an object or participant at a sporting venue being represented by the 3D environment. In this example, the information associating the object with the point cloud data may be used to associate a haptic effect with a specific subset of the point cloud data. In some instances, a discrete subset of the point cloud may be encoded as a separate media stream with its own haptic track. The haptic track may be activated, deactivated, or modulated based on a user's viewpoint. For example, if a point cloud associated with an object (e.g., 632) is within a user's virtual field of view, then a haptic track may be activated. If the point cloud moves outside of the virtual field of view, then the haptic track may be deactivated.

In some aspects, the haptic rendering operation may involve modulating a haptic effect. The modulation may be based on, e.g., how close is an object to a user's viewpoint location in the 3D environment. For instance, as a point cloud associated with the object moves toward a center of the user's virtual field of view, or as it approaches a 3D coordinate of the user's viewpoint location, a haptic track may be increased in magnitude. As the point cloud moves away, the haptic track may be decreased in magnitude. When transitioning from one haptic track to another haptic track based on shifts in visual perspective, a computing device (e.g., 1100) may mix or otherwise combine the haptic tracks to reduce and/or minimize tactile artifacts and ensure a smooth transition.

In some aspects, the computing device may support partial delivery and rendering of content in the media data. The partial delivery and rendering may be based on user-selected location and view within a point cloud scene. In some aspects, the computing device may support a level of density adaptation of point cloud data depending on a user-selected viewpoint location and/or on a capability of a haptic output device used to generate the haptic effect.

As stated above, the haptic rendering operation may generate a haptic effect associated with an object, structure, or event in a 3D environment. In some instances, the event may be a haptic-triggering event, such as a collision in the 3D environment. In such a situation, a computing device performing the haptic rendering operation may be configured to detect the haptic-triggering event, and to perform the haptic rendering operation in response to the haptic-triggering event. For example, the computing device may be configured to detect a collision between an object or structure in the 3D environment and at least a portion of an avatar or other 3D representation of a user in the 3D environment. If the object is represented by a point cloud, the collision detection may involve detecting an intersection between the point cloud and the avatar representing the user. In such an example, the haptic rendering operation may be performed in response to detecting the collision.

In some aspects, the haptic rendering operation may involve generating a drive signal based on a spatial relationship between the user viewpoint location and the object or structure, for example, described by the point cloud data. For example, the spatial relationship may indicate a distance in the 3D environment between the object or structure and an avatar representing the user. In some instances, an intensity of the drive signal may increase as the distance decreases. In some instances, the spatial relationship may indicate whether the object or structure is within a virtual field of view of the user. The drive signal may have increase in intensity as the object or structure moves toward a center of the user's virtual field of view, and may decrease in intensity as the object or structure moves away from the center of the user's virtual field of view.

In some aspects, the haptic rendering operation may include generating a drive signal based on user interaction with the object or structure in the 3D environment. In some instances, the user interaction may involve a user virtually manipulating or otherwise contacting the object. In such instances, the object may have a virtual characteristic, which may be described by the haptic data. The haptic rendering operation may involve generating the drive signal based on the virtual characteristic.

In some aspects, the virtual characteristic may describe a virtual texture of an object (e.g., object 632 in FIGS. 6A-6D) or a structure in the 3D environment. In one example, the haptic data may include a texture map or texture atlas which describes a virtual surface texture or virtual surface material associated with the object or structure. In such an example, the haptic rendering operation may generate the drive signal based on the virtual surface texture or virtual surface material of the object or structure. In some implementations, the haptic data may include a haptic track or haptic profile used to simulate the virtual surface texture or virtual material. The virtual surface features may be defined at design time, such as when the haptic data is generated and encoded into the media data, or may be derived from attributes of a surface geometry, such as applied texture/shaders, visual appearance, or other factors.

In some aspects, the virtual characteristic may be a virtual thermal characteristic of an object or structure. For example, the haptic data may include a virtual thermal profile which simulates virtual heat flux (e.g., sensed through thermoreception) or a virtual material, such as wood or metal. In this example, the drive signal may be generated based on the virtual thermal profile.

In some aspects, the virtual characteristic may describe a virtual firmness or virtual vibration characteristic associated with an object or structure. More particularly, the haptic data may describe a virtual firmness of the object or structure, or describe a virtual vibration emanating from the object or structure. In such an example, the haptic rendering operation may generate the drive signal based on the virtual firmness or the virtual vibration characteristic.

In some aspects, the haptic rendering operation may modulate a haptic effect, such as by varying an intensity and/or frequency of the drive signal. In some instances, the modulation may be based on a user's viewpoint location and/or an orientation of the user's virtual field of view. The user's viewpoint location and/or orientation of the virtual field of view may affect which portion of a 3D environment falls within the virtual field of view. For example, the 3D environment may include a virtual baseball bat which corresponds to a physical baseball bat at a sporting venue. The haptic data may include a haptic track which is generated based on sensor data generated by an inertial sensor embedded in the baseball bat. In this example, the haptic rendering operation may activate the haptic track only if the baseball bat is in the virtual field of view, or only if the user has selected a first person perspective of a player holding the physical baseball bat in the sporting venue. Thus, the haptic rendering operation may generate a drive signal based on which portion of a 3D environment is within a user's virtual field of view. For instance, if an object is within the user's virtual field of view, the haptic rendering operation may increase an intensity of a drive signal. If the object is outside the virtual field of view, the haptic rendering operation may decrease an intensity of the drive signal.

Figure 11A:
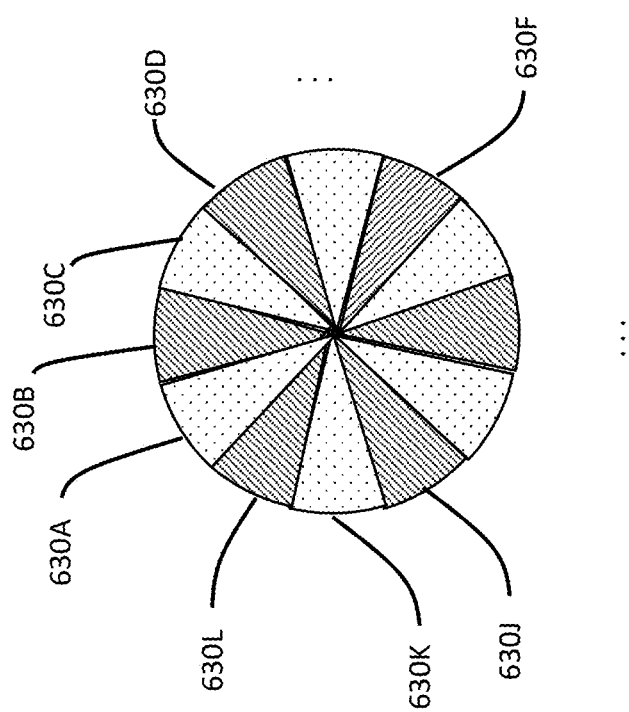
FIGS. 11A-11D illustrate a haptic effect being based on spatial haptic tracks associated with different sectors of a scene, according to an embodiment hereof.
Figure 11C:
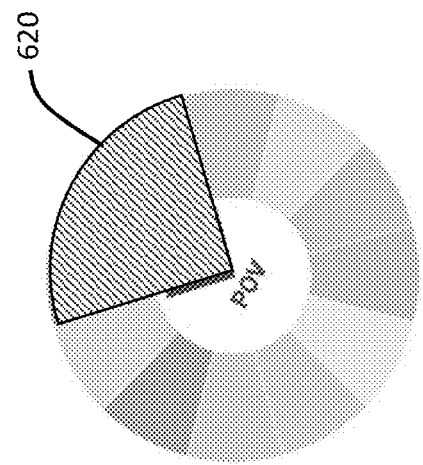
Figure 11D:
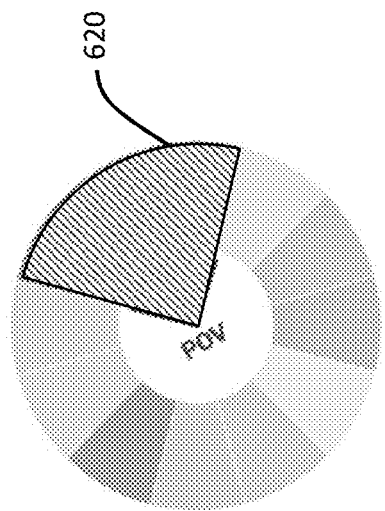
Figure 11B:
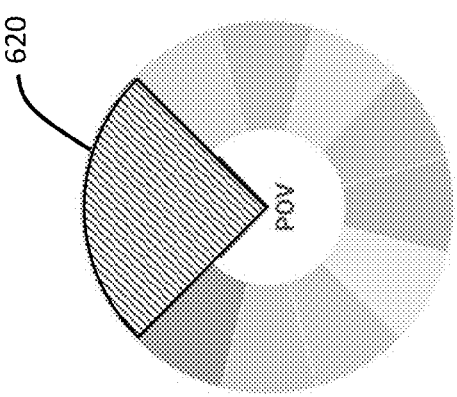

In some aspects, a scene in a 3D environment may be divided into multiple sectors, which may collectively represent multiple directions or viewing angles around a viewpoint location of the user in the 3D environment. For example, FIG. 11A illustrates a scene around a viewpoint location being divided into sectors 630A-630L. In this example, each sector may represent a particular slice or solid angle originating from the viewpoint location. In some implementations, the haptic rendering operation may generate a drive signal based on which sector or which sectors are in a user's virtual field of view. For instance, FIGS. 11B-11D illustrate different sets of sectors falling within a virtual field of view 620 of a user, which may occur as a result of a user changing an orientation of the virtual field of view (e.g., by turning a head of an avatar representing the user).

In some aspects, the haptic rendering operation may involve combining (e.g., mixing) haptic tracks. For example, each of the sectors in FIGS. 11A-11D may be associated with a particular haptic track, which may be referred to as a spatial haptic track. Further, different sectors may be associated with different spatial haptic tracks. In such implementations, the haptic rendering operation may determine which sectors are covered by the user's virtual field of view, and may generate the drive signal by combining spatial haptic tracks associated with these sectors.

Figure 12A:
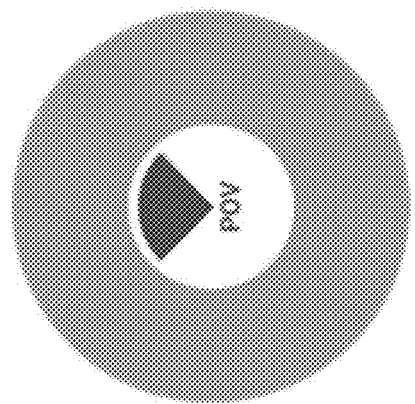
FIGS. 12A-12D depict a haptic effect which combines a global haptic track and spatial haptic tracks, according to an embodiment hereof.

In some aspects, the haptic rendering operation may combine a first haptic track which is associated with a particular viewing angle of a user or a particular portion of the 3D environment which falls within a virtual field of view, and a second haptic track which may be independent of the viewing angle of the user. As an example, the first haptic track may be a first haptic characteristic described by the haptic data. In this example, the haptic rendering operation may select the haptic track based on which sector or sectors are in a user's virtual field of view, and use the haptic track to generate a first intermediate signal. Thus, the haptic rendering operation may generate a first intermediate signal based on the first haptic characteristic and based on the user's virtual field of view in the 3D environment. In some instances, the first haptic track may be a spatial haptic track, while the second haptic track may be a global haptic track, which is independent of a user's viewing angle or viewing direction. FIG. 12A depicts an example of a global haptic track, which may be a second haptic characteristic described by the haptic data. If the 3D environment forms a 360-degree video, the global haptic track may be independent of a user's virtual field of view in the video. The global haptic track may also be used to generate a signal. In other words, the haptic rendering operation may generate a second intermediate signal based on the second haptic characteristic in a manner which is independent of the user's virtual field of view.

Figure 12C:
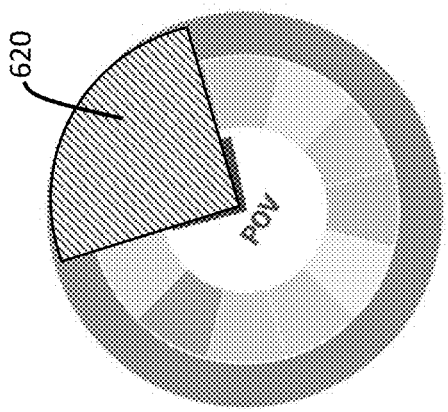
Figure 12D:
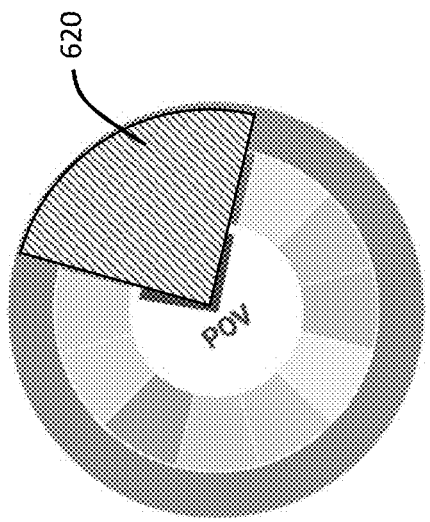
Figure 12B:
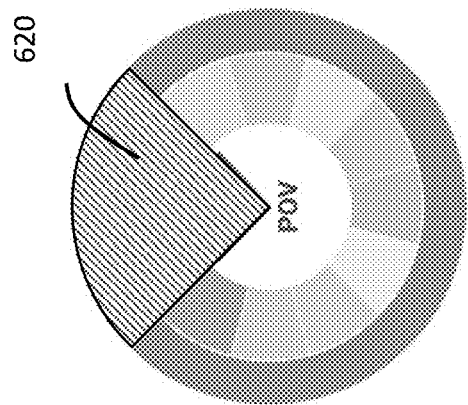

In the above example, the haptic rendering operation may generate the drive signal by combining the first intermediate signal and the second intermediate signal. For instance, FIGS. 12B-12D illustrate a drive signal which mixes or otherwise combines a first (e.g., spatial) haptic track which depends on a user's virtual field of view and a second (e.g., global) haptic track which is independent the user's virtual field of view. The first haptic track for the scenario in FIGS. 12B-12D may be the same as the spatial haptic tracks discussed above with respect to FIGS. 11B-11D, while the second haptic track may be the same as the global haptic track discussed above with respect to FIG. 12A.

In some aspects, the global haptic track may function as a background track. The background haptic track may be, e.g., a haptic characteristic described by the haptic data. For example, if the 3D environment is a 360-degree video that provides a background to an object, structure, or event, the background haptic track may be associated with the 360-degree video. More particularly, the haptic data may describe a first haptic characteristic associated with the object, structure, or event in the 3D environment. The first haptic characteristic may cause a haptic effect to be modulated based on a user's virtual field of view. The haptic data may further describe a second haptic characteristic that is associated with the 360-degree video. The second haptic characteristic may be independent of the user's virtual field of view. The second haptic characteristic may be, e.g., described by a haptic track which is continuously played (e.g., to simulate an effect of crowd noise or on-field noise). In this example, the haptic rendering operation may generate a drive signal for the haptic effect based on the first haptic characteristic and the second haptic characteristic. The resulting haptic effect may have a component which depends on a user's virtual field of view, and may have another component which is independent of the user's virtual field of view.

In some aspects, the haptic rendering operation may be provide a transition between haptic tracks. For instance, if a first haptic track is associated with one type of media data (e.g., audio data or video data) and a second haptic track is associated with another type of media data (e.g., point cloud data), the haptic rendering operation may provide a smooth transition between the first haptic track and the second haptic track. In certain instances, the transition may occur when a user moves a viewpoint location within the 3D environment. For instance, if the 3D environment simulates a room, the transitioning may occur as a user virtually moves from one part of the room to another part of the room. In some implementations, the haptic rendering operation may provide the transition by generating a combined haptic track which combines the first haptic track and the second haptic track. During the transition between the first haptic track and the second haptic track, the haptic rendering operation may play the combined haptic track, which may reduce and/or minimize tactile artifacts and ensure a smooth transition between the haptic tracks.

Figure 13:
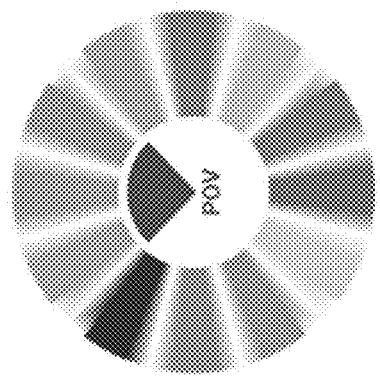
FIG. 13 illustrates a haptic effect which is generated by cross-fading among different haptic tracks, according to an embodiment hereof.

In some aspects, the haptic rendering operation may provide cross fading between haptic tracks, as illustrated in FIG. 13. The cross fading may fade out one haptic track, while fading in another haptic track. The faded out haptic track may be associated with a sector of a scene that is falling out of user's virtual field of view, while the faded in haptic track may be associated with a neighboring sector that is falling into the user's virtual field of view.

Figure 14:
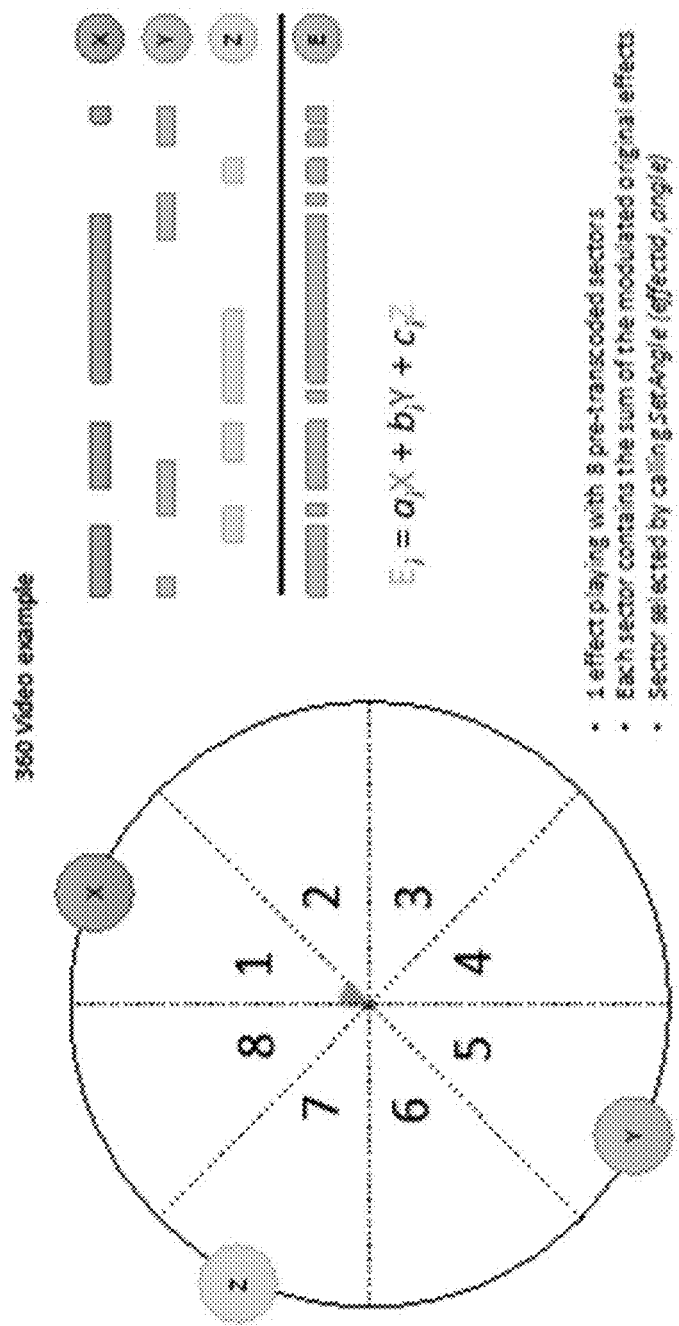
FIGS. 14 and 15 illustrate a haptic effect which is generated by modulating and/or combining haptic tracks, according to an embodiment hereof.
Figure 15:
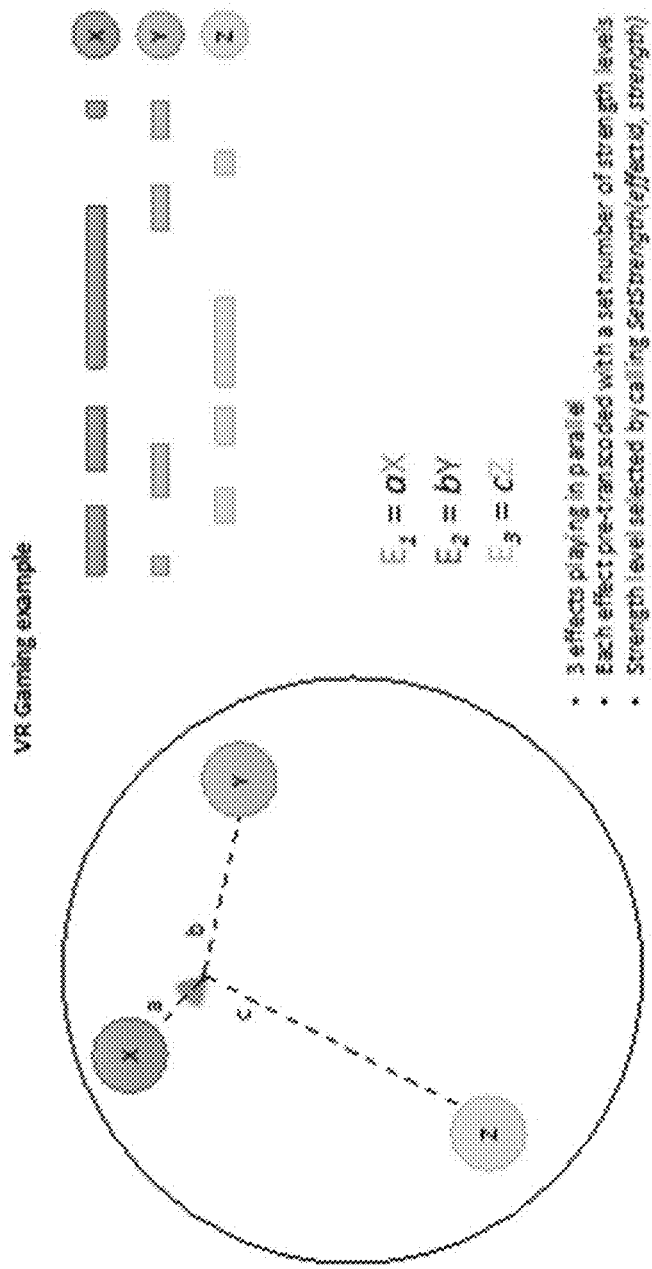

FIGS. 14 and 15 depict another example of a haptic rendering operation that combines multiple haptic tracks, such as to generate a haptic effect for a 360-degree video. In one example, the haptic tracks which are combined may be spatial tracks, and may be combined (e.g., mixed) based on a viewing angle of a user. In some implementations, a function may be applied to each viewing angle that modulates the intensity of its associated haptic track. In the example of FIG. 14, a scene around a user's viewpoint location (e.g., which may be represented by a sphere) may be divided into multiple sectors, wherein each sector may be assigned a particular solid angle. The sectors may be associated with different haptic tracks. For instance, sector 1 may be associated with haptic track X, while sector 5 may be associated with haptic track Y, and sector 7 may be associated with haptic track Z. A composite haptic track or haptic effect may be generated based on individual haptic tracks from the various sectors, such as the haptic tracks X, Y, and Z. In one example, multiple composite haptic effects may be pre-transcoded and made readily available at runtime. The composite haptic tracks are then transcoded into calls into the haptic API of the haptic rendering device and are bundled into a single haptic track. In the example of FIG. 14, the haptic rendering operation may generate a combined haptic track E1 that is a weighted sum of individual haptic tracks, such as $E1=1*X+0.1*Y+0.5*Z$, $E2=0.8*X+0.1*Y+0.4*Z$. The haptic track E1 may be, e.g., a drive signal used to generate a haptic effect at one or more haptic output devices. Thus, the composite haptic effect in FIG. 14 may be based on various spatial haptic tracks that are associated with different viewing angles.

FIG. 15 depicts an example in which a combined haptic track is not only associated with different viewing angles, but also location(s) of an object, structure, or event in a 3D environment. In this example, the individual haptic tracks X, Y, and Z may be modulated based on location or priority. For instance, the haptic track X may be used to generate a haptic effect with no increase or attenuation in intensity, resulting in a drive signal of $E1=1*X$. The haptic track Y may be attenuated by 50%, resulting in a drive signal of $E2=0.5*Y$ for another haptic effect. The haptic track Z may be attenuated by 90%, resulting in a drive signal of $E3=0.1*Z$ for another haptic effect. The haptic effects may be, e.g., generated simultaneously on different haptic output devices.

In some aspects, if the haptic output device (e.g., 1210) is a wearable device among a plurality of wearable devices in communication with a computing device (e.g., 1100) performing the haptic rendering operation, then the haptic rendering operation may include selecting the wearable device from among a plurality of wearable devices to output a haptic effect. In some cases, the plurality of wearable devices may be worn at different portions of a user's body. In such cases, the haptic rendering operation may determine a portion of the user's body at which to output a haptic effect.

In some aspects, a haptic effect that is generated may be associated with an object or structure in the 3D environment, and the haptic rendering operation may generate a drive signal for the haptic effect based on a geometry or geometry type of the object or structure. The geometry type may refer to, e.g., a shape of the object, such as whether the object has a spherical shape, a rectangular shape, a pyramidal shape, or some other shape. In some implementations, the haptic rendering operation may be performed in response to detecting or predicting a collision between the object and a 3D representation (e.g., avatar) of a user in the 3D environment. The haptic rendering operation may cause a haptic effect to indicate the collision or impending collision, which may prevent the user's 3D representation from crossing the boundary of the 3D object. In some instances, the haptic rendering operation may activate a haptic track associated with the user when the collision is detected, regardless of the user's position in the 3D environment.

In some aspects, a structure of object in the 3D environment, such as a statute in a museum, for example, may be divided into multiple 3D sectors, also referred to as multiple 3D portions. In some instances, a haptic effect which is generated from the haptic rendering operation may depend on which 3D portion is interacting with a user. As an example, the multiple 3D portions may be multiple 3D wedges which emanate from a center of the object, or some other common location. The multiple 3D wedges may represent multiple solid angles, and may divide the object into the multiple 3D portions. For instance, if the object is a statute, the statue may be divided into a number s of solid angles or 3D wedges. In this example, different 3D wedges may be associated with different haptic tracks. More particularly, the haptic rendering operation may associate the s 3D wedges with s haptic tracks, and generate a drive signal based on the s haptic tracks. In some instances, drive signal may be generated further based on an additional haptic track which is a global haptic track. In some implementations, the haptic rendering operation may generate the drive signal based on which 3D wedge or 3D portion of the object or structure is receiving user interaction (e.g., being virtually touched by the user) or is within the user's virtual field of view. In some instances, as user interaction moves from a first 3D portion to a second 3D portion, the haptic rendering operation may deactivate or fade out a haptic track associated with the first 3D portion and activate or fade in a haptic track associated with the second 3D portion. In some implementations, the user interaction may involve a user virtually touching the 3D portion of the object or structure, or pointing at the 3D portion of the object or structure via a virtual probe, virtual cursor, or virtual laser pointer in the 3D environment (e.g., as part of a VR interaction).

In some aspects, a structure or object in the 3D environment may be divided into multiple nested shapes which divide the object or structure into multiple layers. In some instances, the haptic data decoded in operation 7002 may include multiple haptic profiles or haptic tracks associated with the multiple nested shapes. The haptic rendering operation may generate a drive signal based on which nested shape of the multiple nested shapes is receiving user interaction. For example, the object may be divided into multiple nested spheres having a common center, which may be a center of the object. In some instances, the object may receive a user interaction in which a portion of an avatar or other 3D representation of the user may move along a depth axis of the object to penetrate into deeper layers of the object. The movement may cause user interaction with different nested shapes of the object. In this example, the drive signal generated during the haptic rendering operation may depend on which nested shape is receiving user interaction. In one example, each layer may have a virtual surface material or virtual surface texture associated with the layer. As the user interaction transitions from a first nested shape to a second nested shape (e.g., next-smallest nested shape), the haptic rendering operation may cause a haptic effect to transition from using a virtual surface material or virtual surface texture associated with the first nested shape to using a virtual surface material or virtual surface texture associated with the second nested shape.

Figure 16:
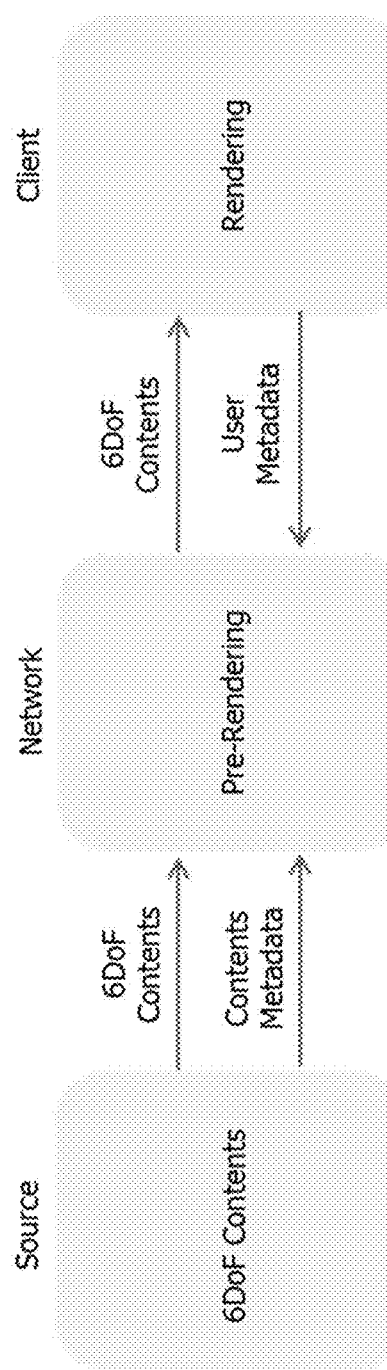
FIG. 16 illustrates a system which includes a network entity for pre-rendering a haptic effect or a portion of a haptic effect, according to an embodiment hereof.

As stated above, the haptic rendering operation may involve pre-rendering at a network entity, which is illustrated in FIG. 16. As illustrated in FIG. 16, the pre-rendering may involve a source of media data, such as 6 DoF content capturing a sports match at a sporting venue, and may involve a network for providing the 6 DoF content to a device at a client side, such as to the computing device 1100 or the user peripheral device 1200 of FIGS. 1A-1D. In some instances, the network may render or otherwise generate at least a portion of a drive signal for a haptic effect associated with the 6 DoF content. The rendering device may be, e.g., a computing device which is at an edge of the network (e.g., at an edge node of a mobile network). In some implementations, the rendering device may render the drive signal for the haptic effect based on a capability of the client side, including a capability of the computing device 1100 or user peripheral device 1200. The network may deliver the rendered signal or the rendered portion of the drive signal to the client side, including the computing device 1100 or the user peripheral device 1200. The pre-rendering may reduce a size of media data which is communicated over the network to the computing device 1100. In some instances, a haptic effect may be defined in metadata at a source and rendered at a device on the client side, such as the computing device 1100 or user peripheral device 1200. If the haptic rendering operation shifts among source, mobile edge, and the client side, haptic tracks may be mixed to reduce and/or minimize tactile artifacts and ensure a smooth transition.

In some aspects, the 3D environment associated with a haptic effect may be part of a chat session, such as a video call, video chat, VR video call, or VR chat. In such aspects, the haptic effect may be associated with the chat session. In some implementations, the chat session may be provided by the system of FIG. 2A or 2B. As depicted in the figures, the chat session may occur between a first user 202A and a second user 202B, or more specifically between a first end user device 1200A (e.g., phone) associated with the first user 202A and a second end user device 1200B associated with the second user 202B. The chat session may in some instances involve more users, such as when the chat session is part of a VR conference. The first end user device 1200A and the second end user device 1200B may have various capabilities. For example, the first end user device 1200A may have motion tracking capability, while the second end user device 1200B may lack such a capability.

Figure 17:
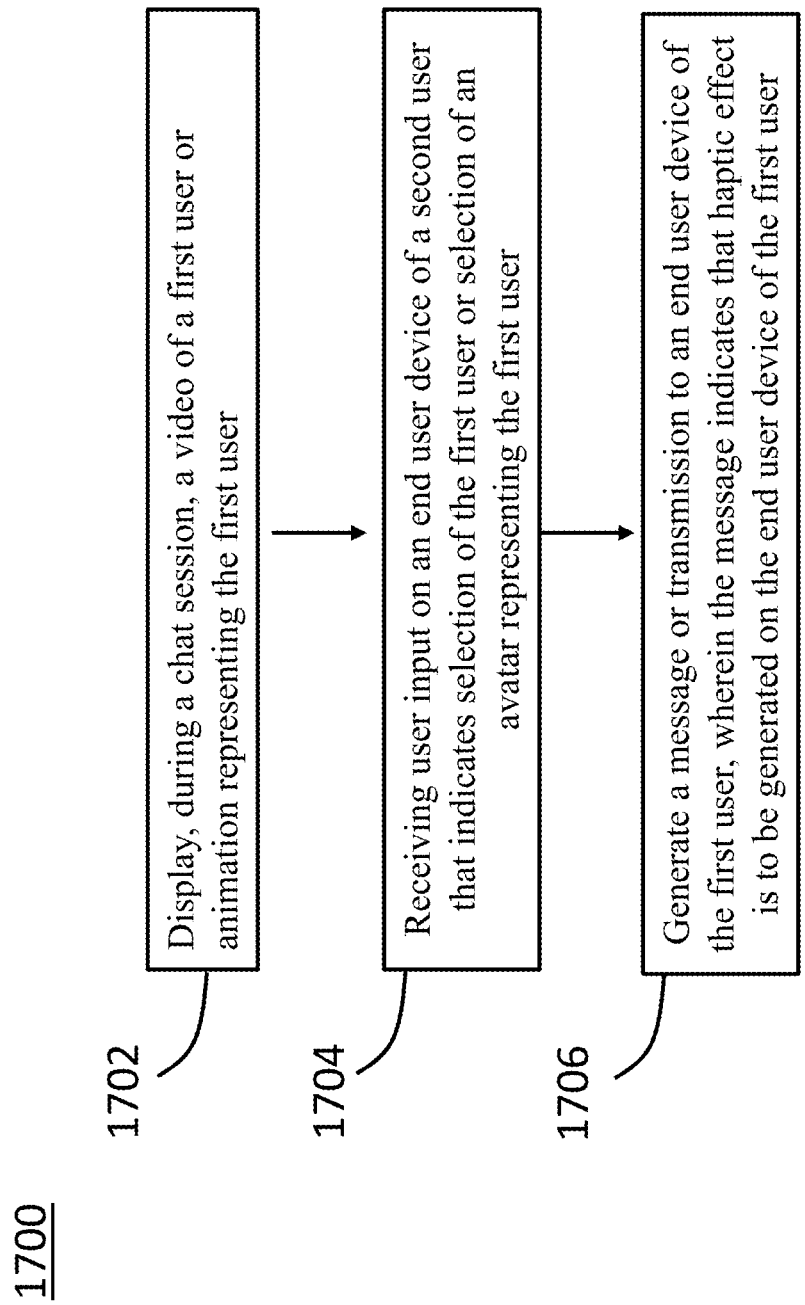
FIG. 17 illustrates a flow diagram of an example method for generating a chat session, according to an embodiment hereof.

FIG. 17 depicts a method 1700 for providing a chat session. The method 1700 may be performed by a computing device, such as the end user device 1200B associated with the second user 202B. In an embodiment, the method 1700 may include an operation 1702, in which the end user device 1200B displays, during a chat session between the first user 202A and the second user 202B, a video of the first user 202A or an animation representing the first user 202A. The end user devices 202A, 202B may include, e.g., a phone, a HMD, or some other end user device. In some instances, the chat session may establish a common VR environment for the two end user devices 202A, 202B. For instance, the first user 202A may be represented in the VR environment through an object (e.g., an animation of the first user 202A), while the second user 202B may be represented in the VR environment through a video of the second user 202B. If the chat session involves a video, the video presented on the end user device 202B may be, e.g., a 360- degree video which provides a panoramic video call for at least one of the users. If the chat session involves an animation, the animation may, e.g., involve an avatar representing one of the users.

In some aspects, the method 1700 may include an operation 1704, in which the end user device 1200B receives a user input that indicates selection of the first user 202A or selection of an avatar representing the first user. For instance, the user input may be a touch gesture received on a screen of the end user device 1200B. The touch gesture may select a video or animation of the first user 202A, wherein the video or animation may be displayed on the screen of the end user device 1200B. If the first user 202A appears in a video being displayed on the end user device 1200B, the user input at the end user device 1200B may select the video or a portion of the video at which the first user 202A is displayed. The user input may, for instance, indicate an intent to cause a haptic effect on an end user device 1200A of the first user 202A. In some instances, the haptic effect may involve a haptic-enabled animation or haptic-enabled image associated with the second user 202B. More particularly, the user input may indicate that a haptic-enabled animation of haptic-enabled image, which may represent the second user 202B, is to be displayed on the end user device 1200A of the first user 202A. The haptic-enabled animation or haptic-enabled image may thus include an animation or image of the second user 202B, which may be viewed by the first user 202A, and may be associated with a haptic effect to be output for the first user 202A.

In some aspects, the method 1700 may include an operation 1706, in which the end user device 1200B generates a message for transmission to the end user device 1200A of the first user 202A. The message may indicate that the haptic effect is to be generated on the end user device 1200A of the first user 202A. In some instances, the message may be based at least in part on the user input received on the end user device 1200B of the second user 202B.

In some aspects, the user input received on the end user device 1200B of the user 202B may indicate that a haptic-enabled animation or haptic-enabled image is to be displayed on the end user device 1200A of the first user 202A. As stated above, the haptic-enabled animation or haptic-enabled image may be an animation or image associated with a haptic effect to be triggered on the end user device 1200A of the first user 202A.

In some aspects, the chat session may allow users to trigger a haptic effect for other users by sending a media element which may be associated with a haptic track. The media element may include, e.g., a haptic sticker, an image, animation, video clip, or virtual object.

In some aspects, the chat session may select between displaying a video of a user or an animation (e.g., avatar) of a user based on a device capability of an end user device. For instance, the end user device 1200B of the second user may determine, based on a device capability of the end user device 1200A of the first user 202A, whether to display a video of the first user 202A or whether to instead display an avatar of the first user 202A. The device capability of the end user device 1200A may, e.g., indicate whether the end user device 1200A is able to generate a 360-degree video or other omnidirectional content.

In some aspects, the message for transmission from the end user device 1200B of the second user 202B to the end user device 1200A of the first user 202B may describes a device capability of the end user device 1200B of the second user 202B. This message may provide information for the end user device 1200A of the first user 202A to determine whether to display a video of the second user 202B or whether to instead display an avatar of the second user 202B. Such a determination may also be based on a device capability of the end user device 1200B of the second user 202B.

Additional Discussion of Various Embodiments

Embodiment 1 relates to a method for providing haptic effects for a three-dimensional (3D) environment that is experienced virtually by a user, the method may be performed by at least one processor of a computing device or a user peripheral device, and may comprise: receiving, by at least one processor, media data that describes the 3D environment, wherein the media data includes: haptic data which describes a haptic characteristic associated with at least one object, structure, or event in the 3D environment; performing, by the at least one processor, a haptic decoding operation that includes extracting the haptic data from the media data; and performing, by the at least one processor. The haptic rendering operation may include: (i) generating a drive signal based on the haptic characteristic and based on at least one of a virtual viewpoint location of a user in the 3D environment or a virtual field of view of the user in the 3D environment, wherein the virtual viewpoint location is a location at which the user is virtually located in the 3D environment, or is a location at which a 3D representation of the user is located in the 3D environment, and (ii) communicating the drive signal to a haptic output device in a user peripheral device in communication with the at least one processor, to cause the haptic output device to generate a haptic effect at the user peripheral device.

Embodiment 2 includes the method of embodiment 1, wherein the media data further includes visual data that describes an appearance of the 3D environment in an omnidirectional manner relative to at least one location in the 3D environment.

Embodiment 3 includes the method of embodiment 1 or 2, wherein the media data that is received includes a payload which has a first payload portion that includes the visual data, a second payload portion that includes the haptic data, and a third payload portion that includes audio data.

Embodiment 4 includes the method of any one of embodiments 1-3, wherein the media data further includes point cloud data that describes the object or structure in the 3D environment, and wherein the haptic rendering operation includes generating the drive signal based on a spatial relationship between the viewpoint location and the object or structure described by the point cloud data.

Embodiment 5 includes the method of any one of embodiments 1-4, wherein the haptic rendering operation includes generating the drive signal based on user interaction with the object or structure in the 3D environment.

Embodiment 6 includes the method of any one of embodiments 1-5, further comprising detecting a collision between at least a portion of the 3D representation of the user and the object or structure, wherein the haptic rendering operation is performed in response to detecting the collision.

Embodiment 7 includes the method of any one of embodiments 1-6, wherein the haptic data includes a texture map or texture atlas that describes a virtual surface texture or virtual surface material associated with the object or structure in the 3D environment, and wherein the haptic rendering operation includes generating the drive signal based on the virtual surface texture or virtual surface material.

Embodiment 8 includes the method of any one of embodiments 1-7, wherein the haptic data describes a virtual thermal characteristic associated with the object or structure in the 3D environment, and wherein the haptic rendering operation includes generating the drive signal based on the virtual thermal characteristic.

Embodiment 9 includes the method of any one of embodiments 1-8, wherein the haptic data describes a virtual firmness characteristic associated with the object or structure in the 3D environment, and wherein the haptic rendering operation includes generating the drive signal based on the virtual firmness characteristic.

Embodiment 10 includes the method of any one of embodiments 1-9, wherein the haptic data describes a virtual vibration characteristic associated with the object or structure in the 3D environment, and wherein the haptic rendering operation includes generating the drive signal based on the virtual vibration characteristic.

Embodiment 11 includes the method of any one of embodiments 1-10, wherein the haptic data includes content which is pre-rendered at a network entity, and wherein the content is received by the at least one processor from the network entity.

Embodiment 12 includes the method of any one of embodiments 1-11, wherein the visual data includes video data for a 360-degree video that describes an appearance of the 3D environment in a manner that allows the virtual field of view within the 3D environment to be controlled with six degrees of freedom (6 DoF).

Embodiment 13 includes the method of embodiment 12, wherein the haptic characteristic associated with the object, structure, or event in the 3D environment is a first haptic track, wherein the haptic data describes a second haptic track associated with the 360-degree video, and wherein the haptic rendering operation includes generating the drive signal based on the first haptic track and the second haptic track.

Embodiment 14 includes the method of embodiment 13, wherein the haptic rendering operation includes: generating a first intermediate signal based on the first haptic track and based on the virtual field of view of the user in the 3D environment, generating a second intermediate signal based on the second haptic track in a manner which is independent of the virtual field of view, such that the second intermediate signal is associated with the 360-degree video and is independent of the virtual field of view, and generating the drive signal based on the first intermediate signal and the second intermediate signal.

Embodiment 15 includes the method of any one of embodiments 1-14, wherein the media data includes audio data, wherein the haptic data includes a haptic characteristic which is associated with the audio data.

Embodiment 16 includes the method of embodiment 15, wherein the audio data describes crowd noise at a venue represented by the 3D environment, and wherein the haptic characteristic describes tactile essence associated with the crowd noise.

Embodiment 17 includes the method of any one of embodiments 1-16, wherein the haptic rendering operation includes generating the drive signal based on at least one of a device type or device capability of the haptic output device in the user peripheral device.

Embodiment 18 includes the method of any one of embodiments 1-17, wherein the user peripheral device is a head-mounted device (HMD).

Embodiment 19 includes the method of any one of embodiments 1-18, wherein the haptic rendering operation includes generating the drive signal based on which portion of the 3D environment is within the virtual field of view of the user.

Embodiment 20 includes the method of any one of embodiments 1-19, wherein the event in the 3D environment is a haptic-triggering event, and wherein the method further comprises detecting the haptic-triggering event, wherein the haptic rendering operation is performed in response to the haptic-triggering event.

Embodiment 21 includes the method of any one of embodiments 1-20, wherein the haptic output device is a wearable device among a plurality of wearable devices in communication with the at least one processor, wherein the haptic rendering operation includes selecting the wearable device, from among the plurality of wearable devices, to output the haptic effect.

Embodiment 22 includes the method of any one of embodiments 1-21, wherein the at least one processor is part of an omnidirectional media format (OMAF) player.

Embodiment 23 includes the method of any one of embodiments 1-22, wherein the haptic data includes a haptic track for simulating vibration emanating from the object or structure, or for simulating a tactile characteristic of a surface of the object or structure.

Embodiment 24 includes the method of claim any one of embodiments 1-23, wherein the haptic rendering operation includes generating the drive signal based on a geometry or geometry type of the object or structure in the 3D environment.

Embodiment 25 includes the method of claim any one of embodiments 1-24, wherein the haptic data includes multiple haptic tracks associated with multiple imaginary 3D wedges that emanate from a common location and divide the object or structure into multiple 3D portions, respectively, and wherein the haptic rendering operation includes generating the drive signal based on which 3D wedge or 3D portion of the object or structure is receiving user interaction or is within the user field of view.

Embodiment 26 includes the method of any one of embodiments 1-25, wherein, when the haptic data includes multiple haptic tracks associated with multiple nested shapes that divide the object or structure into multiple layers, and wherein the haptic rendering operation includes generating the drive signal based on which nested shape of the multiple nested shapes is receiving user interaction.

Embodiment 27 includes the method of any one of embodiments 1-26, wherein the haptic data describes at least a first haptic track and a second haptic track, and wherein the haptic rendering operation includes: generating a combined haptic track which combines the first haptic track and the second haptic track; and causing the combined haptic track to be used in the drive signal during at least a transition between the first haptic track and the second haptic track.

Embodiment 28 relates to a method for providing haptic effects for a chat application. The method may be performed on an end user device of a second user, and may comprise: displaying, during a chat session between a first user and a second user, a video of the first user or an animation representing the first user on an end user device of the second user; receiving user input on the end user device of the second user, wherein the user input indicates selection of the first user, or selection of an avatar representing the first user; generating, by the end user device of the second user, a message for transmission to an end user device of the first user, wherein the message indicates that a haptic effect is to be generated on the end user device of the first user, wherein the message is based in part on the user input received on the end user device of the second user.

Embodiment 29 includes the method of embodiment 28, wherein the user input indicates that a haptic-enabled animation or haptic-enabled image is to be displayed on the end user device of the first user, and wherein the haptic-enabled animation or haptic-enabled image is associated with the haptic effect.

Embodiment 30 includes the method of embodiment 28 or 29, further comprising determining whether to display the video of the first user on the end user device of the second user, or whether to instead display an avatar of the first user on the end user of the second user, wherein the determining is based on a device capability of the end user device of the first user.

Embodiment 31 includes the method of any one of embodiments 28-30, wherein the message for transmission to the end user device of the first user describes a device capability of an end user device of the second user, and wherein the end user device of the first user is configured to determine whether to display a video of the second user or whether to instead display an avatar.

In an aspect, a non-transitory computer-readable medium is provided. The computer-readable medium having instructions stored thereon that, when executed by at least one processor, causes the at least one processor to perform the following for a three-dimensional (3D) environment that is experienced virtually by a user: (1) receiving media data that describes the 3D environment, wherein the media data includes: haptic data which describes a haptic characteristic associated with at least one object, structure, or event in the 3D environment; (2) performing a haptic decoding operation that includes extracting the haptic data from the media data; and (3) performing a haptic rendering operation that includes: (i) generating a drive signal based on the haptic characteristic and based on at least one of a virtual viewpoint location of a user in the 3D environment or a virtual field of view of the user in the 3D environment, wherein the virtual viewpoint location is a location at which the user is virtually located in the 3D environment, or is a location at which a 3D representation of the user is located in the 3D environment, and (ii) communicating the drive signal to a haptic output device in a user peripheral device in communication with the at least one processor, to cause the haptic output device to generate a haptic effect at the user peripheral device.

In an aspect, a computing device is provided. The computing device comprising at least one processor, and a communication device configured to communicate with a haptic output device, wherein the at least one processor is configured to: (1) receive media data that describes a three-dimensional (3D) environment experienced virtually by a user, wherein the media data includes: haptic data which describes a haptic characteristic associated with at least one object, structure, or event in the 3D environment; (2) perform a haptic decoding operation that includes extracting the haptic data from the media data; and (3) perform a haptic rendering operation that includes (i) generating a drive signal based on the haptic characteristic and based on at least one of a virtual viewpoint location of a user in the 3D environment or a virtual field of view of the user in the 3D environment, wherein the virtual viewpoint location is a location at which the user is virtually located in the 3D environment, or is a location at which a 3D representation of the user is located in the 3D environment, and (ii) communicating the drive signal to a haptic output device in a user peripheral device in communication with the at least one processor, to cause the haptic output device to generate a haptic effect at the user peripheral device.

In an aspect, a method of providing haptic effects for a chat application is provided. The method comprises displaying, during a chat session between a first user and a second user, a video of the first user or an animation representing the first user on an end user device of the second user, receiving user input on the end user device of the second user, wherein the user input indicates selection of the first user, or selection of an avatar representing the first user, and generating, by the end user device of the second user, a message for transmission to an end user device of the first user, wherein the message indicates that a haptic effect is to be generated on the end user device of the first user, wherein the message is based on the user input received on the end user device of the second user.

In an aspect, a method of providing a chat session among at least a first user and a second user for a chat application. The method comprises determining, by an end user device of the second user, a device capability of an end user device of the first user, and based on the determined device capability of the end user device of the first user, displaying a video of the first user on the end user device of the second user, or instead displaying an avatar of the first user on the end user of the second user.

The methods, systems, and devices discussed herein are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting. In the present disclosure, the term "or" and "and/or" are used interchangeably. As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in some implementations," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

While various embodiments have been described above, it should be understood that they have been presented only as illustrations and examples of the present invention, and not by way of limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A method of providing haptic effects for a three-dimensional (3D) environment that is experienced virtually by a user, the method comprising:
    receiving, by at least one processor, media data that describes the 3D environment, wherein the media data includes: haptic data which describes a haptic characteristic associated with at least one object, structure, or event in the 3D environment;
    performing, by the at least one processor, a haptic decoding operation that includes extracting the haptic data from the media data; and
    performing, by the at least one processor, a haptic rendering operation that includes:
        (i) generating a drive signal based on the haptic characteristic and based on at least one of a virtual viewpoint location of a user in the 3D environment or a virtual field of view of the user in the 3D environment, wherein the virtual viewpoint location is a location at which the user is virtually located in the 3D environment, or is a location at which a 3D representation of the user is located in the 3D environment, and
        (ii) communicating the drive signal to a haptic output device in a user peripheral device in communication with the at least one processor, to cause the haptic output device to generate a haptic effect at the user peripheral device.

2. The method of claim 1, wherein the haptic data includes a texture map or texture atlas that describes a virtual surface texture or virtual surface material associated with the object or structure in the 3D environment, and wherein the haptic rendering operation includes generating the drive signal based on the virtual surface texture or virtual surface material.

3. The method of claim 1, wherein the haptic data describes a virtual thermal characteristic associated with the object or structure in the 3D environment, and wherein the haptic rendering operation includes generating the drive signal based on the virtual thermal characteristic.

4. The method of claim 1, wherein the haptic data describes a virtual firmness characteristic associated with the object or structure in the 3D environment, and wherein the haptic rendering operation includes generating the drive signal based on the virtual firmness characteristic.

5. The method of claim 1, wherein the haptic data describes a virtual vibration characteristic associated with the object or structure in the 3D environment, and wherein the haptic rendering operation includes generating the drive signal based on the virtual vibration characteristic.

6. The method of claim 1, wherein the haptic data includes content which is pre-rendered at a network entity, and wherein the content is received by the at least one processor from the network entity.

7. The method of claim 1, wherein the media data includes audio data, wherein the haptic data includes a haptic characteristic which is associated with the audio data,
    wherein the audio data describes crowd noise at a venue represented by the 3D environment, and wherein the haptic characteristic describes tactile essence associated with the crowd noise.

8. The method of claim 1, wherein the haptic rendering operation includes generating the drive signal based on at least one of a device type or device capability of the haptic output device in the user peripheral device.

9. The method of claim 1, wherein the haptic output device is a wearable device among a plurality of wearable devices in communication with the at least one processor, wherein the haptic rendering operation includes selecting the wearable device, from among the plurality of wearable devices, to output the haptic effect.

10. The method of claim 1, wherein the haptic rendering operation includes generating the drive signal based on a geometry or geometry type of the object or structure in the 3D environment.

11. The method of claim 1, wherein the haptic data includes multiple haptic tracks associated with multiple imaginary 3D wedges that emanate from a common location and divide the object or structure into multiple 3D portions, respectively, and
    wherein the haptic rendering operation includes generating the drive signal based on which 3D wedge or 3D portion of the object or structure is receiving user interaction or is within the virtual field of view.

12. The method of claim 1, wherein, when the haptic data includes multiple haptic tracks associated with multiple nested shapes that divide the object or structure into multiple layers, and wherein the haptic rendering operation includes generating the drive signal based on which nested shape of the multiple nested shapes is receiving user interaction.

13. The method of claim 1, wherein the media data further includes point cloud data that describes the object or structure in the 3D environment, and
    wherein the haptic rendering operation includes generating the drive signal based on a spatial relationship between the virtual viewpoint location and the object or structure described by the point cloud data.

14. The method of claim 13, wherein the haptic rendering operation includes generating the drive signal based on user interaction with the object or structure in the 3D environment, and wherein the method further comprises detecting a collision between at least a portion of the 3D representation of the user and the object or structure, wherein the haptic rendering operation is performed in response to detecting the collision.

15. The method of claim 1, wherein the media data further includes visual data that describes an appearance of the 3D environment in an omnidirectional manner relative to at least one location in the 3D environment.

16. The method of claim 15, wherein the media data that is received includes a payload which has a first payload portion that includes the visual data, a second payload portion that includes the haptic data, and a third payload portion that includes audio data.

17. The method of claim 15, wherein the visual data includes video data for a 360-degree video that describes an appearance of the 3D environment in a manner that allows the virtual field of view within the 3D environment to be controlled with six degrees of freedom (6 DoF).

18. The method of claim 17, wherein the haptic characteristic associated with the object, structure, or event in the 3D environment is a first haptic track,
 wherein the haptic data describes a second haptic track associated with the 360-degree video, and
 wherein the haptic rendering operation includes generating the drive signal based on the first haptic track and the second haptic track.

19. A method of providing haptic effects for a chat application, the method comprising:
 displaying, during a chat session between a first user and a second user, a video of the first user or an animation representing the first user on an end user device of the second user;
 receiving user input on the end user device of the second user, wherein the user input indicates selection of the first user, or selection of an avatar representing the first user; and
 generating, by the end user device of the second user, a message for transmission to an end user device of the first user, wherein the message indicates that a haptic effect is to be generated on the end user device of the first user, wherein the message is based on the user input received on the end user device of the second user.

20. A method of providing a chat session among at least a first user and a second user for a chat application, the method comprising:
 determining, by an end user device of the second user, a device capability of an end user device of the first user; and
 based on the determined device capability of the end user device of the first user, displaying a video of the first user on the end user device of the second user, or instead displaying an avatar of the first user on the end user of the second user.

* * * * *